(12) United States Patent (10) Patent No.: US 11,663,007 B2
Grocutt et al. (45) Date of Patent: May 30, 2023

(54) CONTROL OF BRANCH PREDICTION FOR ZERO-OVERHEAD LOOP

(71) Applicant: Arm Limited, Cambridge (GB)

(72) Inventors: Thomas Christopher Grocutt, Cambridge (GB); François Christopher Jacques Botman, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/492,068

(22) Filed: Oct. 1, 2021

(65) Prior Publication Data

US 2023/0108825 A1 Apr. 6, 2023

(51) Int. Cl.
*G06F 9/32* (2018.01)
*G06F 9/30* (2018.01)
*G06F 9/38* (2018.01)

(52) U.S. Cl.
CPC .......... *G06F 9/30065* (2013.01); *G06F 9/325* (2013.01); *G06F 9/3846* (2013.01)

(58) Field of Classification Search
CPC ....... G06F 9/325; G06F 9/381; G06F 9/30065
See application file for complete search history.

(56) References Cited

U.S. PATENT DOCUMENTS

| | | | | |
|---|---|---|---|---|
| 7,272,704 B1* | 9/2007 | Nguyen | ................ | G06F 9/3804 712/241 |
| 10,831,499 B2 | 11/2020 | Bouzguarrou et al. | | |
| 2005/0278517 A1* | 12/2005 | Wong | .................... | G06F 9/3846 712/239 |
| 2012/0117362 A1* | 5/2012 | Bhargava | .............. | G06F 9/3848 712/E9.045 |
| 2012/0124344 A1* | 5/2012 | Jarvis | ...................... | G06F 9/325 712/230 |
| 2015/0227374 A1* | 8/2015 | Blasco | .................... | G06F 9/381 712/240 |
| 2017/0344375 A1* | 11/2017 | Zhu | ....................... | G06F 9/30065 |
| 2019/0310851 A1 | 10/2019 | Grocutt | | |
| 2020/0065111 A1* | 2/2020 | Bouzguarrou | ........ | G06F 9/3806 |

OTHER PUBLICATIONS

Joseph Yiu, "Introduction to Armv8.1-M architecture" February, ARM, pp. 2-14 (Year: 2019).*

* cited by examiner

*Primary Examiner* — Courtney P Carmichael-Moody
(74) *Attorney, Agent, or Firm* — Nixon & Vanderhye P.C.

(57) ABSTRACT

In response to decoding a zero-overhead loop control instruction of an instruction set architecture, processing circuitry sets at least one loop control parameter for controlling execution of one or more iterations of a program loop body of a zero-overhead loop. Based on the at least one loop control parameter, loop control circuitry controls execution of the one or more iterations of the program loop body of the zero-overhead loop, the program loop body excluding the zero-overhead loop control instruction. Branch prediction disabling circuitry detects whether the processing circuitry is executing the program loop body of the zero-overhead loop associated with the zero-overhead loop control instruction, and dependent on detecting that the processing circuitry is executing the program loop body of the zero-overhead loop, disables branch prediction circuitry. This reduces power consumption during a zero-overhead loop when the branch prediction circuitry is unlikely to provide a benefit.

17 Claims, 17 Drawing Sheets

| | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| | | | 1st pass includes LS & LE | | | | | zero-overhead loop | | | zero-overhead loop | | | | zero-overhead loop | | | | |
| F | $I_x$ | LS | $I_0$ | $I_1$ | $I_2$ | $I_3$ | LE | $I_0$ | $I_1$ | $I_2$ | $I_3$ | $I_0$ | $I_1$ | $I_2$ | $I_3$ | $I_0$ | $I_1$ | $I_2$ | $I_3$ | $I_z$ |
| D | | $I_x$ | LS | $I_0$ | $I_1$ | $I_2$ | $I_3$ | LE | $I_0$ | $I_1$ | $I_2$ | $I_3$ | $I_0$ | $I_1$ | $I_2$ | $I_3$ | $I_0$ | $I_1$ | $I_2$ | $I_3$ |
| E | | | $I_x$ | LS | $I_0$ | $I_1$ | $I_2$ | $I_3$ | LE | $I_0$ | $I_1$ | $I_2$ | $I_3$ | $I_0$ | $I_1$ | $I_2$ | $I_3$ | $I_0$ | $I_1$ | $I_2$ |

FIG. 3

CONTROL OF BRANCH PREDICTION FOR ZERO-OVERHEAD LOOP

BACKGROUND

Technical Field

The present technique relates to the field of data processing.

Technical Background

A data processing apparatus may have branch prediction circuitry for predicting outcomes of branch instructions. This can help to improve performance by allowing subsequent instructions beyond the branch to be fetched for decoding and execution before the actual outcome of the branch is determined.

SUMMARY

At least some examples provide an apparatus comprising:
decoding circuitry to decode instructions defined according to an instruction set architecture;
processing circuitry to perform data processing in response to the decoded instructions, where, in response to the decoding circuitry decoding a zero-overhead loop control instruction of the instruction set architecture, the processing circuitry is configured to set at least one loop control parameter for controlling execution of one or more iterations of a program loop body of a zero-overhead loop;
loop control circuitry to control, based on the at least one loop control parameter, execution of the one or more iterations of the program loop body of the zero-overhead loop, the program loop body excluding the zero-overhead loop control instruction;
branch prediction circuitry to predict outcomes of branch instructions to be processed by the processing circuitry; and
branch prediction disabling circuitry to:
detect whether the processing circuitry is executing the program loop body of the zero-overhead loop associated with the zero-overhead loop control instruction; and
dependent on detecting that the processing circuitry is executing the program loop body of the zero-overhead loop, disable the branch prediction circuitry.

At least some examples provide a method comprising:
decoding instructions defined according to an instruction set architecture;
performing data processing in response to the decoded instructions, where in response to a zero-overhead loop control instruction of the instruction set architecture, at least one loop control parameter is set for controlling execution of one or more iterations of a program loop body of a zero-overhead loop, where based on the at least one loop control parameter, loop control circuitry controls execution of the one or more iterations of the program loop body of the zero-overhead loop, the program loop body excluding the zero-overhead loop control instruction;
predicting outcomes of branch instructions using branch prediction circuitry;
detecting whether the processing circuitry is executing the program loop body of the zero-overhead loop associated with the zero-overhead loop control instruction; and
dependent on detecting that the processing circuitry is executing the program loop body of the zero-overhead loop, disabling the branch prediction circuitry.

At least some examples provide a non-transitory computer-readable medium to store computer-readable code for fabrication of an apparatus comprising;
decoding circuitry to decode instructions defined according to an instruction set architecture;
processing circuitry to perform data processing in response to the decoded instructions, where, in response to the decoding circuitry decoding a zero-overhead loop control instruction of the instruction set architecture, the processing circuitry is configured to set at least one loop control parameter for controlling execution of one or more iterations of a program loop body of a zero-overhead loop;
loop control circuitry to control, based on the at least one loop control parameter, execution of the one or more iterations of the program loop body of the zero-overhead loop, the program loop body excluding the zero-overhead loop control instruction;
branch prediction circuitry to predict outcomes of branch instructions to be processed by the processing circuitry; and
branch prediction disabling circuitry to:
detect whether the processing circuitry is executing the program loop body of the zero-overhead loop associated with the zero-overhead loop control instruction; and
dependent on detecting that the processing circuitry is executing the program loop body of the zero-overhead loop, disable the branch prediction circuitry.

Further aspects, features and advantages of the present technique will be apparent from the following description of examples, which is to be read in conjunction with the accompanying drawings.

BRIEF DESCRIPTION OF THE DRAWINGS

FIG. 3 is a timing diagram illustrating instructions processed in a zero-overhead loop;

DESCRIPTION OF EXAMPLES

Figure 1:
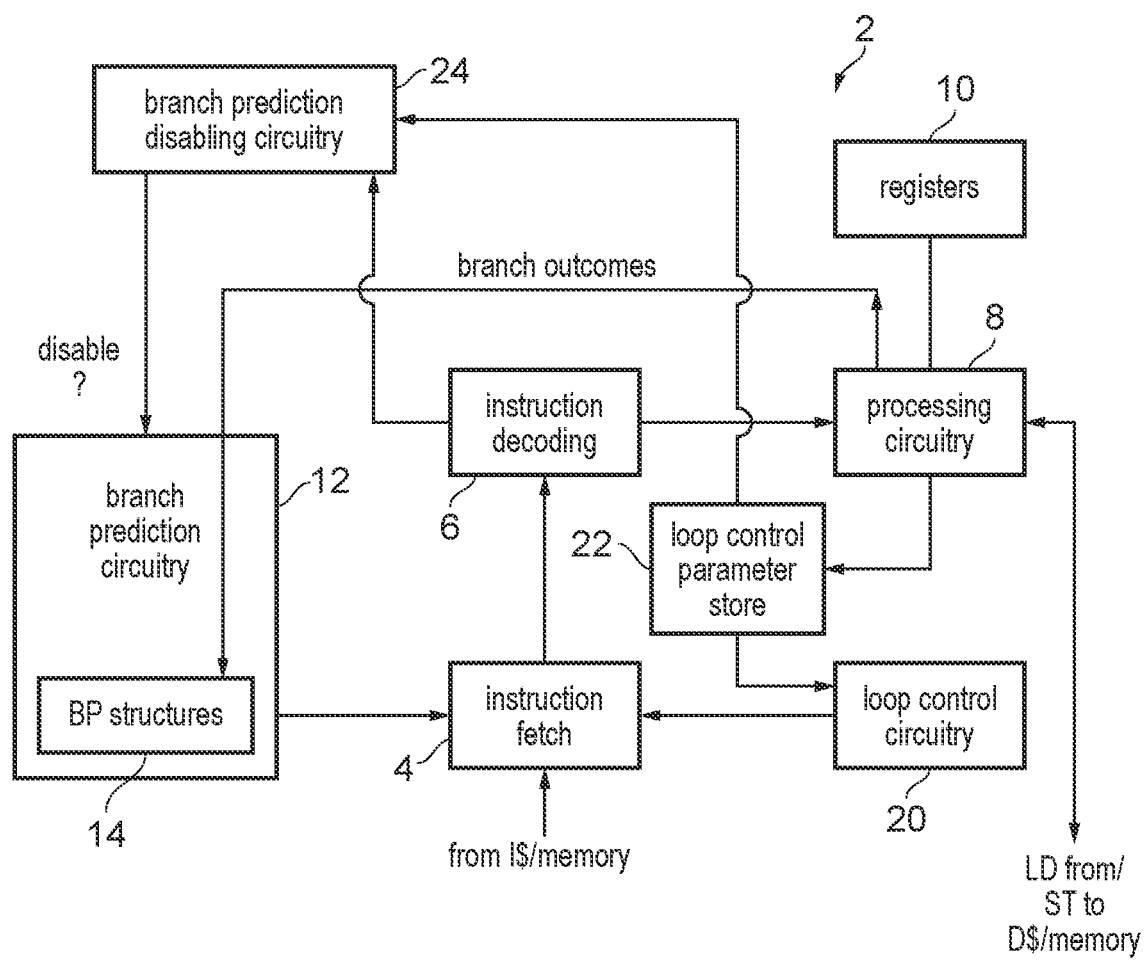
FIG. 1 illustrates a data processing apparatus having branch prediction circuitry and loop control circuitry for controlling processing of zero-overhead loops.

It can be common for software developers to write program code which includes a program loop comprising a program loop body, where the program loop body includes a number of instructions which are to be repeated a number of times until a loop termination condition is satisfied. Although loop constructs (such as for, do, or while loops) are simple to write in a high-level programming language, when the high level program code is compiled into machine program code according to a particular instruction set architecture (ISA), in the absence of zero-overhead loop control mechanisms as discussed below, the loop would typically be translated into a set of instructions which includes a number of loop control instructions for controlling the looping program flow, such as a comparison instruction to evaluate whether the loop termination condition is satisfied and a branch instruction to perform a conditional branch depending on the outcome of the comparison. Such loop control instructions consume pipeline slots which therefore cannot be used by other instructions, and particularly for tight program loops for which the number of instructions in the program loop body is relatively small, a significant fraction of the instructions executed during the loop may be the loop control instructions which do not actually achieve the functional processing required by the program, but are merely controlling the program flow.

Zero-overhead looping is a technique for reducing the performance cost of loop control. An ISA may include support for a zero-overhead loop control instruction which, when executed, controls the processing circuitry to set at least one loop control parameters for controlling execution of one or more iterations of the program loop body. Having executed the zero-overhead loop control instruction, loop control circuitry provided in hardware can control iterations of the program loop body without needing the zero-overhead loop control instruction to be executed again, and without needing explicit branch instructions to be executed. For example, the loop control circuitry may detect when program flow reaches a particular branch point address identified by the at least one loop control parameter, and in response trigger a branch to a start of the program loop body, without needing an explicit branch instruction to be executed. Hence, remaining iterations of the program loop body can be executed more efficiently because the functional instructions of the program loop body make up the majority of the executed instructions as it is not necessary to execute further loop control instructions in each iteration of the loop. Of course, it will be appreciated that the overhead of the zero-overhead loop control is not actually zero, as there may be a small overhead in executing the zero-overhead loop control instruction and in providing the loop control circuitry, but the term "zero-overhead loop" is nevertheless the term of art used by engineers in the field of processor design to refer to loop control mechanisms which do not require the execution of an explicit loop controlling branch on each iteration of the loop. A zero-overhead loop can also be referred to as a "low-overhead loop".

Hence, an apparatus has decoding circuitry to decode instructions defined according to an instruction set architecture, and processing circuitry to perform data processing in response to the decoded instructions. In response to the decoding circuitry decoding a zero-overhead loop control instruction of the instruction set architecture, the processing circuitry sets at least one loop control parameter for controlling execution of one or more iterations of a program loop body of a zero-overhead loop. Loop control circuitry is provided to control, based on the at least one loop control parameter, execution of the one or more iterations of the program loop body of the zero-overhead loop, where the program loop body iterated by the loop control circuitry excludes the zero-overhead loop control instruction itself.

The apparatus also has branch prediction circuitry for predicting outcomes of branch instructions to be processed by the processing circuitry. For example, the branch prediction circuitry may predict whether an instruction at a particular instruction address will be a branch instruction at all, and if it is predicted to be a branch instruction may predict properties such as the branch direction (whether the branch is taken or not taken) and branch target address (the instruction address of the next instruction to be executed after the branch instruction in cases when the branch is taken). In modern processors, the branch prediction circuitry can be a significant contributor towards the high levels of performance that are achievable when executing program code, as the branch prediction circuitry can make predictions which allow a processing pipeline to be filled with instructions beyond a branch so that, in the majority of cases when the branch prediction is correct, the pipeline can be filled with a continuous sequence of instructions without bubbles. However, the branch prediction circuitry may consume a significant amount of power. For example, the branch prediction circuitry may maintain various data structures providing branch prediction state for making its predictions, and the lookups to those data structures may be performed frequently (e.g. almost every cycle) consuming a significant amount of power. For the majority of program execution, that power consumption can be justified because it may be expected that there may be a reasonable number of branches for which the branch prediction circuitry provides a benefit in terms of performance.

However, the inventors have recognized that, when the processing circuitry is executing the program loop body of a zero-overhead loop, the branch prediction circuitry may provide very little benefit in terms of performance, because the loop program flow during the zero-overhead loop can already be determined accurately based on the at least one loop control parameter that has been configured in response to execution of the zero-overhead loop control instruction of the ISA. Also, during the execution of the zero-overhead loop then there may be relatively few branches being executed (as the need for loop controlling branches has been eliminated by virtue of the zero-overhead loop control mechanism) and so in any case there will be relatively few branches to train the branch predictor on while executing the program loop body of the zero-overhead loop. In some program workloads such as digital signal processing (DSP) the program loop bodies may not contain "if/else" or "switch" statements, so the use of a zero-overhead loop instruction may eliminate all explicit program flow instructions from a program loop body. Hence, continuing to look up branch prediction structures during the program loop body of the zero-overhead loop may waste power with relatively little performance advantage.

Therefore, the apparatus has branch prediction disabling circuitry for detecting whether the processing circuitry is executing the program loop body of a zero-overhead loop that is associated with the zero-overhead loop control instruction defined in the ISA. Dependent on detecting that the processing circuitry is executing the program loop body of the zero-overhead loop, the branch prediction disabling circuitry disables the branch prediction circuitry. This helps to save power. There can be some program workloads, such as digital signal processing (DSP) or some library program code such as memory copy functions, for which a significant proportion of the overall execution time may be spent on relatively tight program loop for which the zero-overhead loops are beneficial, and so the power efficiency of these loops can be important. Hence, by disabling the branch prediction circuitry when it is detected that the processing circuitry is executing the body of such a zero-overhead loop, this can provide a significant amount of power saving.

When the branch prediction circuitry is disabled, the branch prediction circuitry may suppress lookups of one or more branch prediction structures storing branch prediction state information used to predict outcomes of branch instructions. Also, the branch prediction circuitry may suppress training of branch prediction state based on the instructions executed during the program loop body of the zero-overhead loop.

Having disabled the branch prediction circuitry, the branch prediction disabling circuitry may re-enable the branch prediction circuitry in response to detecting that the processing circuitry is no longer executing the program loop body of the zero-overhead loop, For example, there may be a number of ways in which the processing circuitry could be detected as no longer executing the program loop body of the zero-overhead loop. For example, the branch prediction disabling circuitry may detect that the processing circuitry is no longer executing the program loop body of the zero-overhead loop in response to determining that: a final iteration of the zero-overhead loop is complete; a branch within the loop is taken that branches to an address outside the program loop body (e.g. a branch that evaluates whether a break condition is satisfied has been found to be taken); and/or an interrupt, exception or fault has occurred that causes a handler to start executing.

The branch prediction disabling circuitry may detect that the processing circuitry is executing the program loop body of the zero-overhead loop, in response to identifying that the zero-overhead loop control instruction defined in the instruction set architecture is executed, or has been executed, by the processing circuitry.

Hence, in some examples the detection of execution of the zero-overhead loop control instruction itself may trigger the branch prediction disabling circuitry to detect that the processing circuitry is currently executing a zero-overhead loop. For this purpose, the execution of the zero-overhead loop control instruction could be identified at various stages of a processing pipeline, e.g. at an execute stage at which most types of instructions (such as arithmetic/logical instructions to be processed by an arithmetic/logical unit (ALU)) are executed, or at an earlier stage of the pipeline. In some implementations the zero-overhead loop control instruction could be retired at a relatively early stage of the pipeline (e.g. a decode stage for decoding instructions or an issue stage for queuing instructions awaiting operands to become available until they are ready to be issued for execution) to remove the zero-overhead loop control from the stream of instructions which will be issued for execution, because the setting of the at least one loop control parameter could be instigated from that earlier stage, so it will be appreciated that the execution of the zero-overhead loop control instruction does not need to be at the same stage at which other instructions would be executed (such as arithmetic or logical instructions which may be executed using an arithmetic/logical units (ALU)).

In other examples, the branch prediction disabling circuitry may be able to detect that the processing circuitry is executing the program loop body of the zero-overhead loop based on information which indicates that the zero-overhead loop control instruction has been executed, rather than detecting the presence of a zero-overhead loop directly in response to the execution of the zero-overhead loop control instruction. For example, the detection of the presence of the zero-overhead loop could be based on the at least one loop control parameter used by the loop control circuitry to control zero-overhead loop program flow. The at least one loop control parameter may be evidence that the architectural instruction for zero-overhead loop control has previously been executed.

Either way, the detection that the processing circuitry is executing the program loop body of the zero-overhead loop is based on a consequence of execution of an architectural instruction provided for zero-overhead loop control. Hence, it is not necessary to provide micro-architectural loop detection mechanisms for learning indirectly from observation of outcomes of executed instructions whether a program loop is being executed, which may be more prone to misprediction and may consume a significant amount of power in training prediction state information and looking up the prediction state information. Another disadvantage of relying on such micro-architectural loop detection mechanisms to detect the zero-overhead loop may be that they may rely on detecting a certain sequence of branch instruction outcomes which indicates repeated branching through iterations of a program loop (such as a number of successive instances of a branch at a given address being not taken before the same branch being detected as taken), and in a zero-overhead loop such a pattern of branch instructions may simply not arise because the very purpose of the zero-overhead loop control mechanism is to eliminate such loop controlling branches. Also, such micro-architectural loop detection mechanisms may have a warm up time while the prediction state is being trained, before the predictor can establish sufficient confidence that the presence of a loop has been detected. Hence, using such a micro-architectural loop detection mechanism may make it difficult to detect the presence of the program loop body until the whole loop has been executed a number of times. In contrast, in the examples discussed below the detection of the program loop body of the zero-overhead loop is based on detecting the execution of the architecturally defined zero-overhead loop control instruction (either directly, or indirectly based on the loop control information set as a consequence of execution of the instruction), to allow the branch prediction circuitry to be disabled faster and more reliably than would be possible with such micro-architectural control mechanisms. Even on the very first pass through a zero-overhead loop, the branch prediction disabling circuitry can identify based on information indicative of execution of the zero-overhead loop control instruction that a zero-overhead loop is being executed and disable the branch prediction circuitry accordingly.

The zero-overhead loop control instruction can be implemented in different ways. For example, the ISA may support one or both of: a zero-overhead loop start instruction for execution before a start of the program loop body, and/or a zero-overhead loop end instruction for execution at an end of the program loop body. The detection of the execution of the program loop body of the zero-overhead loop could be based on either the zero-overhead loop start instruction, or the zero-overhead loop end instruction, or both.

In one example, in response to the decoding circuitry decoding the zero-overhead loop control instruction (which could be either a loop start instruction preceding the program loop body or a loop end instruction following the program loop body), the processing circuitry is configured to: at least when at least one further iteration of the program loop body is required, set the at least one loop control parameter to specify a value indicative of a loop start address and a value indicative of a branch trigger address, where the branch trigger address is indicative of an instruction at which a branch to the loop start address is to be triggered by the loop control circuitry for any further iterations of the program loop body. The execution of such a zero-overhead loop control instruction may also trigger the branch prediction disabling circuitry to detect that the processing circuitry is executing the program loop body of the zero-overhead loop. Such a zero-overhead loop control instruction enables further loop iterations to be controlled without needing an explicit loop controlling branch on every iteration.

In another example, both a loop start instruction and a loop end instruction are provided by the ISA. In response to the decoding circuitry decoding a loop start instruction, the processing circuitry is configured to: at least when at least one iteration of the program loop body is required, set the at least one loop control parameter to specify that a zero overhead loop is being processed. In such examples, in response to the decoding circuitry decoding of the loop end instruction, the processing circuitry is configured to: at least when at least one further iteration of the program loop body is required, set a further loop control parameter to specify a value indicative of a loop start address, and a value indicative of an instruction at which a branch to the loop start address is to be triggered by the loop control circuitry for any further iterations of the program loop body. The execution of such a zero-overhead loop start instruction may also trigger the branch prediction disabling circuitry to detect that the processing circuitry is executing the program loop body of the zero-overhead loop.

In one particular example, the zero-overhead loop control instruction comprises a zero-overhead loop end instruction for execution at an end of the program loop body, the zero-overhead loop end instruction specifying a value indicative of a loop start address indicative of an instruction at a start of the program loop body. In response to the decoding circuitry decoding the zero-overhead loop end instruction, the processing circuitry is configured to determine whether at least one further iteration of the program loop body is required; at least when the at least one further iteration of the program loop body is required, set the at least one loop control parameter to specify a value indicative of the loop start address and a value indicative of a branch trigger address indicative of an instruction at which a branch to the loop start address is to be triggered by the loop control circuitry for any further iteration of the program loop body; and when the at least one further iteration of the program loop body is required, branch to the loop start address. Such a zero-overhead loop end instruction which is intended for inclusion at the end of the program loop body and which, in addition to setting the at least one loop control parameter, also causes a backwards branch to the loop start address if a further iteration of program loop body is required, can be useful because this means that if execution of the zero-overhead loop is interrupted partway through (e.g. due to the occurrence of an interrupt or fault) then even if the at least one loop control parameter is invalidated when handling the cause of the interruption, on the resumption of processing after handling of the cause of the interruption the zero-overhead loop end instruction will be executed again and can reset the at least one loop control parameter so that remaining iterations of the program loop body can again execute without needing to repeat the zero-overhead loop end instruction for the remaining iterations. This means that architecture designers would not be required to provide a way to save the at least one loop control parameter on occurrence of an interrupt as the at least one loop control parameter would naturally be restored when encountering the zero-overhead loop end instruction again when resuming the loop after handling of the interrupt is complete. Hence, the detection of the presence of the program loop body of a zero-overhead loop for the purpose of disabling the branch prediction circuitry could be based on execution of such as zero-overhead loop end instruction.

The ISA may also support a zero-overhead loop start instruction for execution before the start of the program loop body. The zero-overhead loop start instruction may specify an iteration target parameter indicative of a target number of iterations of the program loop body to be performed and a value indicative of a loop end address indicative of an instruction following an end of the program loop body; and in response to the decoding circuitry decoding the zero-overhead loop start instruction, the processing circuitry may; determine based on the iteration target parameter whether the target number of iterations is zero; and when the target number of iterations is determined to be zero, branch to the loop end address. Such a zero-overhead loop start instruction can be useful because sometimes the number of iterations of the loop body that are to be performed may depend on a data-dependent variable calculated by an earlier instruction and sometimes that variable may indicate that the required number of iterations is actually zero. By using the zero-overhead loop start instruction it becomes possible to skip over the entire program loop body so as to prevent the program loop body being executed at all, in cases where the target number of iterations is zero, which helps to improve performance as it can avoid needing to include a separate conditional branch instruction before the start of the zero-overhead loop merely for evaluating whether the loop is required at all (such conditional branch instructions can be hard to predict and so can lead to greater branch misprediction penalties than if the zero-overhead loop start instruction is used). The definition of the target number of iterations using the zero-overhead loop start instruction can also be useful to set a loop control parameter which enables the loop control circuitry to determine when the final iteration of the loop has been reached and hence decide when to terminate the loop and move on to subsequent processing after the zero-overhead loop. Hence, such a zero-overhead loop start instruction can also be used by the branch prediction disabling circuitry to detect the presence of a zero-overhead loop and therefore disable the branch prediction circuitry.

Some ISAs may only support one of a zero-overhead loop start instruction and a zero-overhead loop end instruction. However, the combination of both zero-overhead loop end instruction and a zero-overhead loop start instruction as described in the previous two paragraphs can be particularly useful to enable the ISA to support both the restoration of the zero-overhead loop when resuming the loop after an interruption and the option of skipping over the entire loop if the target number of iterations and zero, which would not be possible if only one of the zero-overhead loop end instruction and zero-overhead loop start instruction were supported.

In ISAs which support both the zero-overhead loop start instruction and the zero-overhead loop end instruction, the branch prediction disabling circuitry could detect the processing circuitry executing the program loop body of the zero-overhead loop based on either the zero-overhead loop start instruction, or the zero-overhead loop end instruction, or both. In some cases, execution of a zero-overhead loop start instruction before proceeding with the zero-overhead loop could be optional and so in some program applications only the zero-overhead loop end instruction may appear, so it can be useful to provide circuitry for detecting based on the zero-overhead loop end instruction that the processing circuitry is executing the program loop body of a zero-overhead loop. However, in cases when the zero-overhead loop start instruction is included in the program code being executed then the zero-overhead loop start instruction can allow the presence of the zero-overhead loop to be detected earlier than if only the zero-overhead loop end instruction was used to trigger detection of the zero-overhead loop. Hence, it can be useful for some apparatuses to support detection of the zero-overhead loop based on both types of instruction.

As mentioned above, the zero-overhead loop control (e.g. start or end) instruction may cause at least one loop control parameter to be set specifying a value indicative of a loop start address and a value indicative of a branch trigger address. The loop start address and branch trigger address could be identified in different ways by the value setting the loop control parameter. In some cases the loop start address or branch trigger address could be identified directly as an absolute address value. However, it is also possible to encode the loop start address or the branch trigger address in other ways within the stored loop control parameter. For example, one of the loop start address of the branch trigger address could be encoded as a relative address indicated as an offset relative to the other of the loop start address in the branch trigger address. In other ISAs one of the loop start or loop end addresses may be implicitly specified, for example the branch trigger address may implicitly be the address of the instruction directly before the loop end instruction, or the loop start address may implicitly be the address of the instruction directly after the loop start instruction, In such embodiments the other address may be specified as an address relative to the loop control instruction, for example the loop start address could be encoded as an address relative to the address of the loop end instruction. Also, in some cases the at least one loop control parameter may not indicate all of the bits of the loop start address of the branch trigger address. For example, in some architectures all instructions may be stored at addresses aligned to a certain address boundary, for example 16-bit aligned. and so it may be unnecessary to store the least significant bits of the address (which may always be zero) explicitly in the stored loop control parameter. Also, some ISAs may limit the maximum size of the program loop body, thereby reducing the number of bits required to represent a loop start or end address as a relative address. Alternatively or in addition, some ISAs may limit the range of addresses which can validly be specified as instruction addresses (e.g. addresses with a certain number of most significant bits set to 1 could be excluded from being specified as valid instruction addresses), and so again this may mean that certain bits of the loop start address or the branch trigger address do not need to be stored (such as one or more most significant bits which may implicitly be 0 for valid instruction addresses). Also, it may be possible in some implementations that the loop start address or the branch trigger address is represented in a hashed form, for example to reduce the number of bits of the address that need to be stored. The hash function could be chosen so that, for a zero-overhead loop expected to have relatively few instructions within the program loop body, it is statistically improbable that the addresses of the instructions within the program loop body (which may generally be in a certain contiguous block of instruction addresses) may hash to the same stored representation of the branch trigger address or the loop start address.

Hence, it will be appreciated that a wide variety of techniques can be used to represent the at least one loop control parameter and the approach described below is not limited to any of these techniques. As mentioned above, it is not essential that the at least one loop control parameter, which is set in response to the zero-overhead loop control instruction that causes the detection that the processing circuitry is in a program loop body, indicates one or both of the loop start address and branch trigger address. For example, in the case when both loop start/end instructions are provided as mentioned above, the loop start instruction could cause a loop control parameter to be set specifying that the program loop body of a zero-overhead loop is being executed, but the setting of a value indicative of the loop start address and/or branch trigger address could be triggered by the loop end instruction. Nevertheless, it could be the loop start instruction that causes the detection that the processing circuitry is executing the program loop body of the zero-overhead loop.

In some implementations, the branch prediction disabling circuitry could disable the branch prediction circuitry whenever it is detected that the processing circuitry is executing the program loop body of the zero-overhead loop, However, sometimes a branch instruction (other than the loop controlling branch instruction that would normally be included for loop control in a standard loop not using a zero-overhead loop mechanism) may appear within the program loop body of a zero-overhead loop. For example, the branch could be evaluating a certain data-dependent condition to determine whether it is necessary to execute one or more optional instructions that are not needed in some conditions and are needed in other conditions. Some implementations may nevertheless choose to disable the branch prediction circuitry when in a zero-overhead loop (regardless of the presence of any branches within the program loop body) and tolerate any branch penalty which may arise if a branch is taken within the body of the zero-overhead loop. In practice, the occurrence of such taken branches may be relatively rare. For example, in some workloads such branches may only be included to detect certain error conditions which may rarely occur and so the majority of time such branches may be not taken, and so it may be considered that the power cost of running the branch prediction circuitry may not be justified merely to be able to predict the rare occasions when such a branch is taken. In any case, for such infrequently taken branches the branch prediction circuitry may anyway predict the branch as not taken the majority of times and so, even if enabled, the branch prediction circuitry may still end up mispredicting the outcome of the error-condition-evaluating branch on the rare occasion that it needs to be taken.

However, for other workloads there may sometimes be some branches which may be taken more frequently. Hence, some implementations may prefer to provide the branch prediction disabling circuitry with some circuit hardware logic which can detect whether there are enough branches within the program loop body of the zero-overhead loop to justify enabling the branch prediction circuitry, to provide conditional disabling of the branch prediction circuitry during the zero-overhead loop depending on this monitoring.

Hence, for some examples, in response to detecting that the processing circuitry is executing the program loop body of the zero-overhead loop, the branch prediction disabling circuitry may detect whether a predetermined condition is satisfied depending on occurrence of one or more branch instructions within the program loop body of the zero-overhead loop, and disable the branch prediction circuitry when the predetermined condition is satisfied. By providing support for detecting the presence of branch instructions within the program loop body of the zero-overhead loop, a more informed estimation of whether the power cost of the branch prediction circuitry is justified can be made to improve the balance between power consumption and performance for a particular workload being executed.

The branch prediction disabling circuitry may determine that the predetermined condition is satisfied when one of: there are no branch instructions within the program loop body of the zero-overhead loop; or there are no taken branch instructions within the program loop body of the zero-overhead loop. It may be simpler to implement detection of the presence of branch instructions irrespective of whether they are taken or not taken, so this would be an option for some implementations. However, the performance benefits of running the branch prediction circuitry may be greatest if there are taken branches (as for not taken branches the cost of looking up the branch prediction circuitry may not be justified as the not taken behaviour would be the default prediction implicitly determined if the branch prediction circuitry is disabled), and so implementations which enable detection of the predetermined condition based on whether there are no taken branches within the program loop body can provide an improved balance between performance and power consumption.

Some implementations may determine whether the predetermined condition is not satisfied based on detecting the presence of any branch, or any taken branch, within the program loop body, regardless of the particular number or frequency of such branches or taken branches. In some cases the occurrence of even a single branch (or for representations which specifically detect taken branches, a single taken branch) may be sufficient to determine that the predetermined condition is not satisfied.

However, other examples may gather a branch monitoring metric which provides more detailed information on the relative frequency of occurrence of branches or taken branches and may determine whether the predetermined condition is satisfied based on the branch monitoring metric. For example, the occasional occurrence of a taken branch could be tolerated without requiring the branch prediction circuitry to be enabled, as the misprediction penalty for relatively few taken branches may be considered to be insignificant in comparison to the power cost of looking up the branch prediction circuitry throughout the zero-overhead loop. If the branch monitoring metric indicates that the frequency of occurrence of branches, or of taken branches, is greater than a threshold then this may cause the predetermined condition to be determined to be not satisfied so that the branch prediction circuitry should not be disabled (or should be re-enabled) despite the detection that the processing circuitry is executing the body of a zero-overhead loop.

The branch monitoring metric could indicate the frequency of occurrence of branches or taken branches in various ways. For example, the branch monitoring metric could simply indicate a count of the number of (taken) branch instructions detected within the program loop body. However, in one particular example the frequency of occurrence could be indicated as a fraction of the total number of instructions of the program loop body, or as a fraction of the combined total number of instructions executed across multiple iterations of the program loop body. The same absolute number of branches may be less significant when executed in a long program loop body than for a short program loop body. Therefore, indicating the frequency of occurrence of branches as a fraction of the number of executed instructions can be helpful because this gives better information about the relative performance penalty of disabling the branch prediction circuitry despite the presence of such branches. Some implementations may evaluate the fraction over a single loop iteration. However it can also be beneficial for the fraction to be evaluated relative to the total number of instructions executed across multiple iterations of the program loop body, because this may give more information about the probability of a taken branch occurring. For example, some branches may only be taken every $N^{th}$ iteration, or at irregular intervals of iterations, and so sampling across multiple iterations can give more information about the actual performance cost of occasionally incurring the penalty of a taken branch when executing the zero-overhead loop.

For some examples, the branch prediction disabling circuitry may adjust, based on a user-configured control parameter, a criterion applied to the branch monitoring metric to determine whether the predetermined condition is satisfied. For example, the user-configured control parameter could define a threshold against which the branch monitoring metric is compared to determine whether the predetermined condition is satisfied, or could define information which affects how the branch monitoring metric is detected (e.g. a relative weighting assigned to occurrence of branches when gathering the branch monitoring metric). By allowing the user to influence the analysis of the branch monitoring metric, this can allow different users to choose whether to prioritise power consumption savings or performance improvements. A user who wishes to prioritise performance improvements may set the user-configured control parameter so that it is less likely that the branch prediction circuitry is disabled when a given frequency of branches is detected within the program loop body of the zero-overhead loop, while a different user who wishes to prioritise power consumption savings may set the user-configured control parameter in a different way to increase the likelihood that the branch prediction circuitry is disabled during an zero-overhead loop.

In some examples, the branch prediction disabling circuitry may determine whether the predetermined condition is satisfied based on zero-overhead loop branch occurrence history information detected for a previous instance of executing the entire zero-overhead loop associated with a previous instance of the zero-overhead loop control instruction. Hence, the branch prediction disabling circuitry may learn from previous occurrences of the entire zero-overhead loop, rather than needing to freshly detect information about occurrence of taken branches within the loop each time. For example, some information associating addresses of a portion of the zero-overhead loop with history information indicating the likelihood of occurrence of taken branches in the loop body could be stored within the loop control information maintained by the new control circuitry for controlling program flow in the zero-overhead loop, or maintained by the branch prediction circuitry, and this could be used to predict whether the predetermined condition will be satisfied for the zero-overhead loop hence whether to disable the branch prediction circuitry.

In implementations which enable this learning of history of previous attempts of executing the entire zero-overhead loop then even on the first iteration through the zero-overhead loop the branch prediction disabling circuitry may already be able to make an informed decision as to whether the power cost of the branch prediction circuitry is justified, However, if this history information is not available (either because the particular implementation of the branch prediction disabling circuitry does not support use of such history information at all, or in an implementation which does support use of such history information, because this is the very first time the zero-overhead loop has been encountered) then for at least one initial iteration through the program loop body there may be a period when the occurrence of (taken) branches is being monitored before the branch prediction disabling circuitry can gain confidence in deciding whether it is preferable to enable or disable the branch prediction circuitry for remaining iterations. Different approaches can be taken for deciding whether, during that initial period of monitoring, the branch prediction circuitry should be enabled by default or disabled by default.

In one example, during at least one initial iteration of the program loop body of the zero-overhead loop executed after detecting that the processing circuitry is executing the program loop body of the zero-overhead loop, the branch prediction disabling circuitry evaluates whether the predetermined condition is satisfied, and in response to determining that the predetermined condition is satisfied, disables the branch prediction circuitry for any subsequent iteration of the program loop body of the zero-overhead loop. Hence, with this option, performance is prioritised over power saving, as the branch prediction disabling circuitry is enabled by default in the period before the branch prediction disabling circuitry is able to determine whether the predetermined condition is satisfied.

More particularly, in one implementation, during at least one initial iteration of the program loop body of the zero-overhead loop executed after detecting that the processing circuitry is executing the program loop body of the zero-overhead loop, the branch prediction disabling circuitry is configured to detect a taken branch metric indicative of a number of taken branch instructions within the program loop body of the zero-overhead loop, and in response to determining that the taken branch metric indicates a number or frequency of taken branch instructions less than a threshold, to disable the branch prediction circuitry for any subsequent iteration of the program loop body of the zero-overhead loop.

For other implementations, in response to detecting that the processing circuitry is executing the program loop body of the zero-overhead loop, the branch prediction disabling circuitry is configured to initially disable the branch prediction circuitry while evaluating whether the predetermined condition is satisfied, and re-enable the branch prediction circuitry in response to determining that the predetermined condition is unsatisfied. This approach may prioritise power saving over performance because the branch prediction circuitry is disabled by default in the period when occurrence of branches is still being monitored to decide whether the predetermined condition is satisfied.

More particularly, in one implementation, in response to detecting that the processing circuitry is executing the program loop body of the zero-overhead loop, the branch prediction disabling circuitry is configured to initially disable the branch prediction circuitry while detecting a taken branch metric indicative of a number of taken branch instructions within the program loop body of the zero-overhead loop, and re-enable the branch prediction circuitry in response to determining that that the taken branch metric indicates a number or frequency of taken branch instructions less than a threshold.

In some implementations, the branch prediction disabling circuitry may maintain a zero-overhead loop active indication which indicates whether the processing circuitry is currently executing the program loop body of a zero-overhead loop. The branch prediction disabling circuitry may detect, based on the zero-overhead loop active indication, whether the processing circuitry is executing the program loop body of the zero-overhead loop associated with the zero-overhead loop control instruction, and hence whether to consider disabling the branch prediction circuitry (possibly based on evaluation of the predetermined condition as mentioned earlier). The zero-overhead loop active indication could for example be flag which may be set to one value (e.g. 1) when the program loop body is detected as being executed and to another value (e.g. 0) when the program loop body is not detected as being executed. For example the flag could be maintained alongside the at least one loop control parameter used by the loop control circuitry to control program flow in the zero-overhead loop, or could be maintained as part of branch prediction control information used by the branch prediction circuitry. In other examples the at least one loop control parameter may comprise the zero-overhead loop active indication, and be set in response to the zero-overhead loop control instruction.

The zero-overhead loop active indication could be set in response to various events. For example, in response to the processing circuitry executing the zero-overhead loop control instruction of the instruction set architecture (e.g. the zero-overhead loop start instruction or zero-overhead loop end instruction as discussed above), when at least one more iteration of the program loop body is required after execution of the zero-overhead loop control instruction, the branch prediction disabling circuitry may set the zero-overhead loop active indication to indicate that the processing circuitry is executing the program loop body of the zero-overhead loop.

Alternatively, in response to a zero-overhead loop end branch operation being performed following a given iteration of the program loop body of the zero-overhead loop to branch to a start of the program loop body of the zero-overhead loop fora subsequent iteration, the branch prediction disabling circuitry may set the zero-overhead loop active indication to indicate that the processing circuitry is executing the program loop body of the zero-overhead loop. This zero-overhead loop end branch operation can be triggered either by the execution of the zero-overhead loop end instruction, or by the loop control circuitry fora subsequent loop iteration without the zero-overhead loop end instruction being executed again. Hence, with this option it is not necessary for the execution of the zero-overhead loop control instruction itself to cause the detection of the presence of the zero-overhead loop for the purpose of disabling the branch prediction circuitry. The detection of the presence of the zero-overhead loop may be triggered by the new control circuitry initiating the branch at the end of one iteration of the program loop body which causes program flow to loop back to the start of the program loop body for a subsequent iteration. This is an example where an indirect consequence of execution of the zero-overhead loop control instruction can be detected as the prompt for the branch prediction disabling circuitry to detect that the program loop body of the zero-overhead loop is being executed.

The zero-overhead loop active indication can be cleared in response to various events. For example, the zero-overhead loop active indication can be cleared in response to detecting that no further iterations of the program loop body of the zero-overhead loop are required. Also, the branch prediction disabling circuitry may clear the zero-overhead loop active indication in response to detecting one of: occurrence of a taken branch instruction within the program loop body of the zero-overhead loop that branches to an address outside the program loop body; the occurrence of an exception such as an interrupt that halts execution of the program loop body and transfers execution to an exception handler; and the decode circuitry decoding a loop cancel instruction. In some implementations rather than providing more complex schemes for monitoring branch occurrence metrics, a relatively simple implementation for preventing the branch prediction circuitry being disabled in response to detection of a (taken) branch while the zero-overhead loop active indication is set may be simply to clear the zero overhead loop active indication.

FIG. 1 schematically illustrates an example of a data processing apparatus 2, for example a processor, for instance a central processing unit (CPU), graphics processing unit (GPU) or other processing circuit capable of executing program instructions defined in a particular instruction set architecture (ISA). The apparatus has instruction fetch circuitry 4 for fetching program instructions from an instruction cache or memory, and instruction decoding circuitry 6 for decoding the fetched program instructions. Based on the decoded instructions, the instruction decoding circuitry 6 controls processing circuitry 8 to perform data processing operations represented by the instructions. Registers 10 are provided to store operands for the processed instructions, and results of executed instructions are written back to the registers 10. The processing circuitry 8 includes various execution units, such as an ALU for performing arithmetic or logical operations, a branch unit to process branch operations, and load/store circuitry which controls loading of data from the memory system to the registers 10 and storing of data from the registers 10 to the memory system in response to load/store instructions (the memory system can include one or more data caches and main system memory).

The apparatus 2 has branch prediction circuitry 12 for predicting the outcomes of branch instructions to be processed by the processing circuitry 8. The branch prediction state circuitry 12 maintains one or more branch prediction storage structures 14 indicating prediction state information that can be used by the branch prediction circuitry 12 to predict which instruction addresses relate to branch instructions, and for those instruction addresses predicted to relate to branch instructions, predict an outcome of the branch instructions, such as a prediction of whether the branch will be taken or not taken, or a prediction of branch properties such as a branch type or branch target address (the address to which the branch directs program flow when taken). Outcomes of branch instructions executed by the processing circuitry 8 are used to update the prediction state information in the branch prediction structures 14. Any known branch prediction technique may be used to maintain the branch prediction state and predict the branch outcomes. The predictions made by the branch prediction circuitry 12 are used to control which instructions are fetched by the instruction fetch stage 4. The instruction to be fetched next after a branch can be selected based on whether the branch prediction circuitry 12 predicts the branch is taken or not taken. If a branch misprediction is detected, when the actual outcome of the branch determined by the processing circuitry 8 differs from the prediction made for that branch by the branch prediction circuitry 12, a branch misprediction recovery operation can be initiated, for example to flush from a processing pipeline instructions that were incorrectly fetched after the branch and resume fetching of instructions from the instruction that should have been executed after the branch given the correct branch outcome. Also, the branch prediction state storage structures 14 may be updated in response to the branch misprediction, to reduce the probability of the misprediction happening again in future.

The apparatus 2 also has loop control circuitry 20 for controlling program flow during execution of a zero-overhead loop. The instruction set architecture supported by the instruction decoding circuitry 6 and processing circuitry 8 includes at least one type of zero-overhead loop control instruction which, when decoded, causes the processing circuitry 8 to set one or more loop control parameters in a loop control parameter store 22. The one or more loop control parameters can be used by the loop control circuitry 20 to control the instruction fetch circuitry 4 to fetch the instructions of the program loop for a number of iterations without requiring an explicit branch instruction to be executed on each iteration of the zero overhead program loop. This contrasts with standard techniques for implementing program loops where an explicit loop controlling branch would be needed on each iteration to control branching back to the start of the loop for the next iteration.

Figure 2:
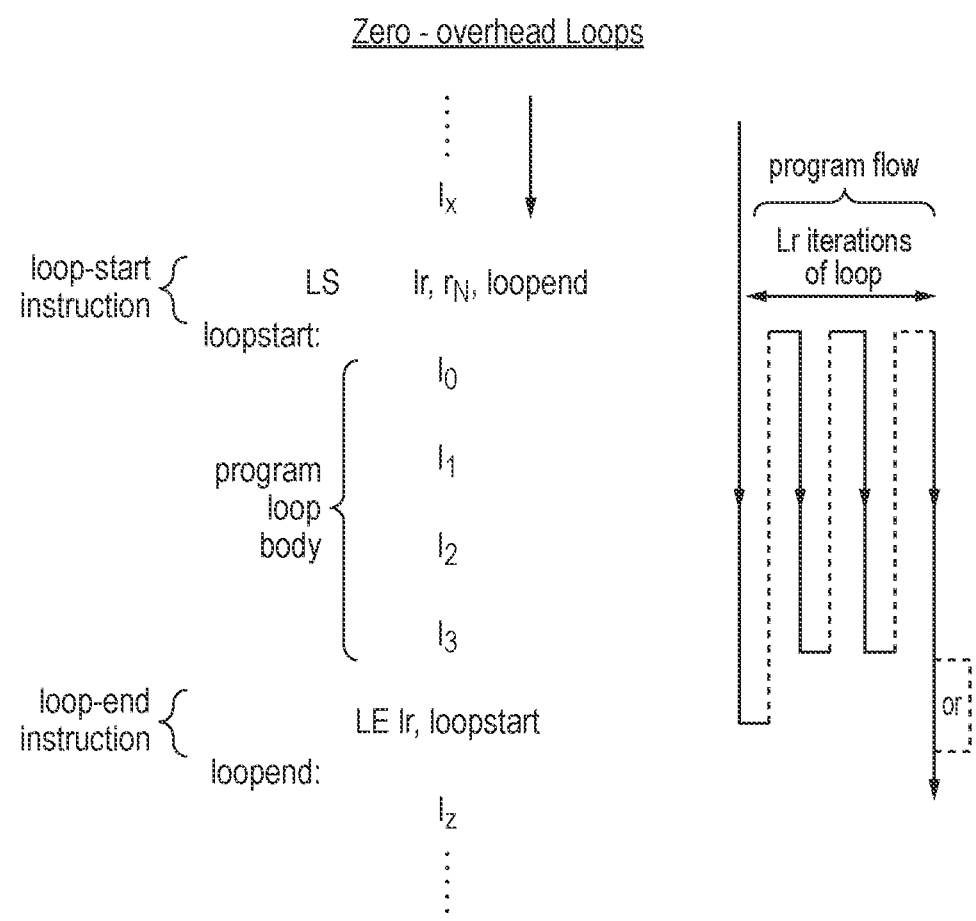
FIG. 2 illustrates processing of the zero-overhead loop.

FIG. 2 schematically illustrates an example of processing of a zero-overhead loop, in an example where the ISA supports a zero-overhead loop start instruction LS and a zero-overhead loop end instruction LE. The zero overhead loop start instruction LS is designed to be included in the program code before the first instruction $I_0$ of a program loop body to be executed on each iteration of the loop. The zero-overhead loop end instruction is designed to be included in the program code after the final instruction $I_3$ of the program loop body.

The zero-overhead loop start instruction LS specifies an iteration target parameter, in this example specified using a value stored in a register $r_N$ specified by the instruction, and a value indicative of a loop end address "loopend" which is indicative of an instruction $I_z$ following the end of the program loop body. The iteration target parameter identifies a target number of iterations of the program loop body to be performed. In this example, in response to the LS instruction, the processing circuitry 8 copies the indication of the target number of iterations to a link register (Lr), which is a register used for storing function return address when a function is called. By copying the target number of iterations to the link register, this allows the general purpose register $r_N$ used to specify the iteration target parameter to be reused for other purposes within the program loop body. The value included in the link register may act as a running count of the number of remaining iterations of the loop to be performed, and may be decremented each time the program flow returns to the start of the program loop body (whether that return to the start of the loop is triggered by the loop end instruction LE or by the loop control circuitry 20 based on the loop control parameters). Maintaining this running count within the link register can be convenient because it means that the processing circuitry 8 when processing the LE instruction to check the iteration count, and the loop control circuitry 20 which controls looping for subsequent iterations, do not need to be aware of which particular general purpose register was used by the LS instruction to specify the target number of iterations. It will be appreciated that saving the target number of iterations to the link register is just one example and there may be other ways of preserving the indication of how many iterations are to be executed in the loop. For example the target number of iterations could be saved to the loop control parameter store 22. The loop end address could be identified by the LS instruction in various ways, for example by specifying an offset relative to a reference address such as the program counter address of the LS instruction or relative to a base address stored in a register specified by the LS instruction. The loop end address could also be identified indirectly by specifying the number of instructions that occur between the LS instruction and the instruction $I_z$ indicated by the loop end address. In general, the loop end address can be any parameter which enables identification of the address of the instruction $I_z$ representing a point in program flow to which a branch is to be performed if the target number of loop iterations required is 0.

In response to the LS instruction, the processing circuitry 8 checks the indication of the target number of iterations. and if the target number of iterations is zero then a branch to the loop end address is triggered to skip over the entire program loop body. This behaviour can be useful because there may be some occasions when the target number of iterations may depend on a previous data-dependent operand, so that it is possible that the target number of iterations may be zero on some occasions, and using the LS instruction to trigger the jump over the loop body may be less prone to branch misprediction than if a conditional branch instruction was used to check whether the loop needs to be executed. In some implementations the LS instruction may also trigger setting a loop control parameter in the loop control parameter store 22 to indicate that zero-overhead loop is in progress.

The zero-overhead loop end instruction LE specifies a value indicative of a loop start address "loopstart" which is indicative of an instruction $I_0$ at the start of the program loop body. Again, the loop start address could be specified by the instruction in various ways, for example as an absolute address or as an offset relative to a reference address such as an address stored in a particular register or the instruction address of the loop end instruction itself. The loop start address could also be implicitly identified by specifying the number of instructions that appear between the instruction Io at the start of the program loop body and the loop end instruction LE. In response to the instruction decoding circuitry 6 decoding the zero-overhead loop end instruction LE, the processing circuitry 8 determines, based on the iteration count value maintained in the link register or a different location (e.g, as part of the loop control parameters) whether at least one further iteration of the program loop body is still required. At least when a further iteration of the program loop body is required, the processing circuitry 8 sets the stored loop control parameters to specify a value indicative of the loop start address "loopstart" as well as a value indicative of a branch trigger address which indicates an instruction at which a branch to the loop start address is to be triggered by the loop control circuitry for any further iteration of the program loop body. These addresses can be represented in the stored loop control parameters in different ways, e.g. using absolute or relative addresses, using a representation which omits certain bits that can be implicitly be determined (e.g. bits that are 0 for all valid instruction addresses), or as a hash function of the address that can be compared against a corresponding hash generated from a program counter address representing the current point of program flow reached, to determine whether it is likely that the program counter address matches the address from which the hash was generated.

In the example shown in FIG. 2, the branch trigger address may implicitly be defined as the address of the instruction $I_3$ immediately preceding the LE instruction, so that the loop end instruction itself does not need to explicitly identify the branch trigger address. However, other variants of the zero-overhead loop end instruction LE could specify a parameter identifying the branch trigger address.

Also, in response to decoding of the zero-overhead loop end instruction LE, at least when it is determined that at least one further iteration is required, the value stored in the link register (or if stored elsewhere, the running count of the number of remaining iterations) is decremented.

Also, in response to the decoding of the zero-overhead loop end instruction LE, when it is determined that at least one further iteration of the program loop body is required, the processing circuitry 8 triggers a branch to the instruction at the loop start address, which in this example is instruction $I_0$.

Hence, for the first iteration through the zero-overhead loop, the executed stream of instructions includes the zero-overhead loop start instruction LS, the instructions $I_0$ to $I_3$ of the program loop body and the zero-overhead loop end instruction LE. However, by the time the loop end instruction LE has been processed, the loop control parameters stored in the loop control parameter store 22 now specify information allowing the branch trigger address and loop start address to be identified without needing a subsequent branch instruction or the loop end instruction LE to be executed again for further iterations of the program loop body. Hence, for subsequent iterations through the program loop body, each time program flow reaches the instruction $I_3$ at the branch trigger address, the loop control circuitry 20 automatically triggers a branch back to the loop start address, with the program loop body excluding the loop end instruction LE itself so that the overhead of the loop end instruction is encountered only on the first iteration of the zero-overhead loop. The program loop body also does not include the loop start instruction LS.

FIG. 3 which shows a pipelined timing diagram illustrating the fetching, decoding and execution of the stream of instructions shown in FIG. 2 by the instruction fetch circuitry 4, instruction decoding circuitry 6 and processing circuitry 8 respectively, for a number of iterations of the program loop body of the zero-overhead loop. As shown in FIG. 3, the LS and LE instructions only need to be executed in the first pass through the loop and subsequently the only fetched, decoded and executed instructions are the instructions of the program loop body itself so that the later iterations do not incur any performance penalty associated with loop control instructions.

Sometimes, an exception, fault or interrupt may occur partway through processing zero-overhead loop, and this could lead to an exception handler being executed, To prevent the loop control circuitry 20 incorrectly controlling the instruction fetch circuitry 4 to fetch the instructions of the program loop body while the handler should be executed, the loop control parameters stored in the loop control parameter store 22 may be invalidated in response to the exception, fault or interrupt. It is possible to preserve the stored loop control parameters in a state in which they are not used for controlling instruction fetching, to allow the loop control to resume once the handler has finished. However, even if that loop control state is not preserved during the handling of the exception, fault or interrupt, this is not a problem because on the first iteration of the zero-overhead loop performed after returning from the handler, if the loop control state has been lost then the loop end instruction LE will be encountered once more and can then reset the loop control state to control the loop control circuitry 20 to control looping program flow and omit the processing of the LE instruction on subsequent iterations of the loop.

The inclusion of the loop start instruction is optional, as on other occasions the particular number of iterations to be performed in the loop may not be known in advance (for example, the loop could continue to execute until at certain condition is satisfied, with that condition being evaluated within the program loop body). Hence, in other examples the zero-overhead loop end instruction could be the only zero-overhead loop control instruction included in the program code. In this case, there is no need for the loop end instruction to check a running count of iterations in the link register or decrement that running count. Instead, in the absence of an earlier loop start instruction the zero-overhead loop may continue to iterate until a break condition (evaluated by a conditional branch instruction included within the program loop body) determines that program flow should branch out from the program loop body to another instruction that is not part of the program loop body.

In the example of FIG. 2 the loop start instruction is included immediately before instruction $I_0$ at the start of the program loop body. However, this is not essential and it would be possible for other instructions to be included between the loop start instruction and the start of the program loop body, which could be used to ensure that certain preliminary functions are performed before the first iteration of the program loop body which are not required for subsequent iterations. Similarly, in an implementation where the LE instruction explicitly identifies the branch trigger address, it would also be possible for additional instructions to be included between the end of the program loop body identified by the branch trigger address and the LE instruction itself.

FIGS. 2 and 3 show one particular example of zero-overhead loop control instructions, but it will be appreciated that other instruction set architectures could use a different form of zero-overhead loop control instruction. For example, some architectures may only support a loop start instruction, so that the branch trigger address and loop start address may be configured in response to a loop start instruction, rather than in response to a loop end instruction as shown in FIG. 2. In general, the zero-overhead loop control instruction can be any architecturally defined instruction of an instruction set architecture that causes the processing circuitry 8 to store, in a loop control parameter store 22, one or more loop control parameters which can be used by loop control circuitry 20 provided in hardware to control program flow of a program loop without needing explicit loop controlling branch to be executed on each iteration of the loop.

For some workloads, a significant proportion of the overall execution time may be spent in loops like these. As a result the power efficiency of these loops is very important. In cases like these, the branch predictor 12 may not provide any benefit (because the loop branch is handled by the dedicated zero overhead loop control hardware 20, and there may be no other control flow within the program loop body, so there is no need to predict the outcome of an executed branch instruction). However, if the branch predictor 12 remains enabled it will still be consuming power as looks up its prediction structures 14 every cycle and updates its prediction state stored in the structures 14.

For power efficiency it is proposed to disable the branch prediction circuitry, e.g. by gating off the inputs to the branch predictor 12, when it is detected that the body of a zero-overhead loop is being executed (in some cases, disabling the branch predictor 12 may be dependent on a predetermined condition, such as the occurrence of no taken branches, also being satisfied, although this is not essential).

Hence, as shown in FIG. 1 the apparatus 2 comprises branch prediction disabling circuitry 24 for detecting whether the processing circuitry 8 is executing the program loop body of a zero-overhead loop, and dependent on detecting that the processing circuitry is executing the program loop body of the zero-overhead loop, disabling the branch prediction circuitry 12. For example, when the branch prediction circuitry 12 is disabled, lookups of the branch prediction structures 14 can be suppressed to save power, and updates of the branch prediction structures 14 in response to detected branch outcomes of executed branch instructions can also be suppressed.

Figure 4:
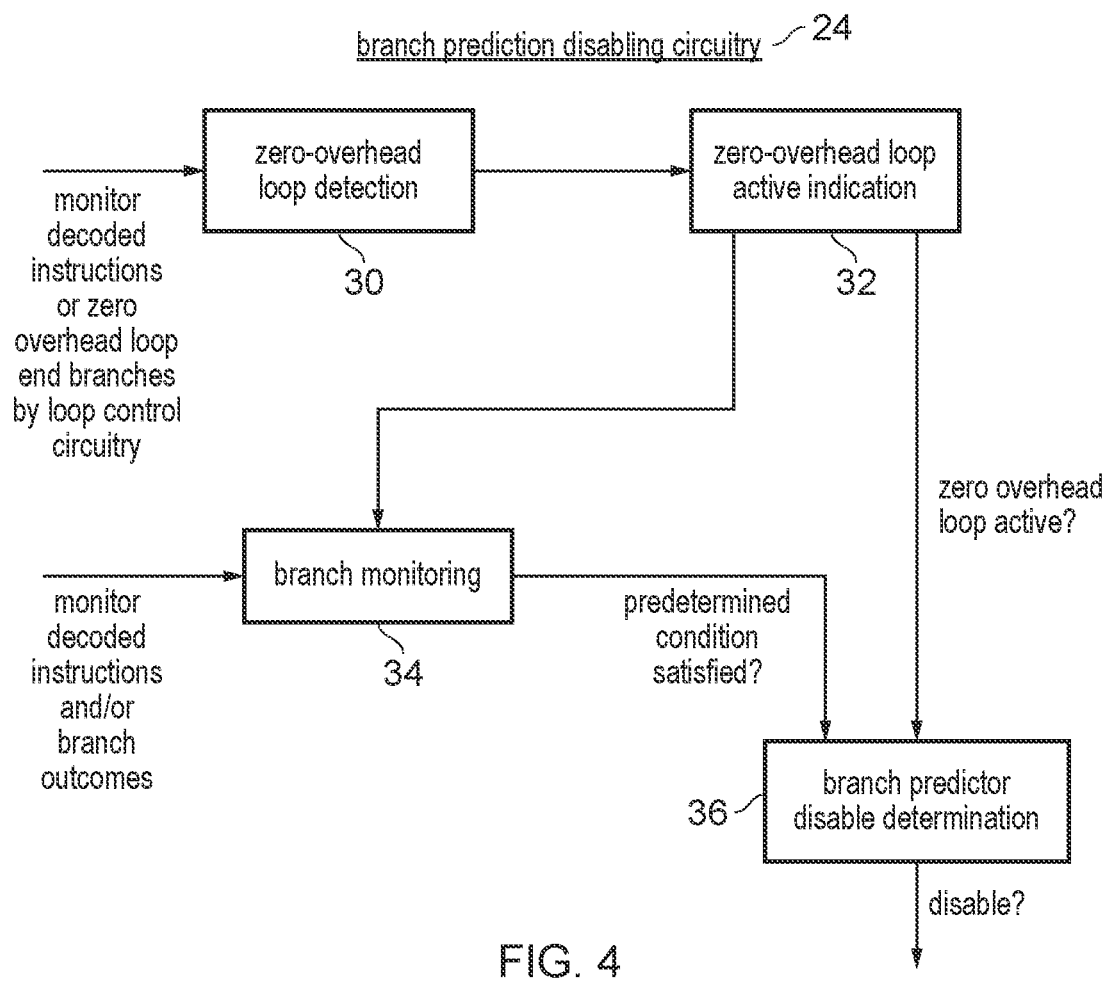
FIG. 4 illustrates branch prediction disabling circuitry.

FIG. 4 shows in more detail the branch prediction disabling circuitry 24. The branch prediction disabling circuitry 24 includes zero-overhead loop detection circuitry 30 for detecting whether the processing circuitry 8 is currently executing the program loop body of the zero-overhead loop. The detection performed by the branch prediction disabling circuitry 24 is based on detecting that the architecturally defined zero-overhead loop control instruction (e.g. the loop start or end instruction LS, LE mentioned earlier) is being executed or has been executed. For example, the zero-overhead loop detection circuitry may receive a signal from the instruction decoding circuitry 6 indicating whether the decoded instruction is a zero-overhead loop control instruction, and when decoding of such an instruction is detected then the zero-overhead loop detection circuitry 30 may set a zero-overhead loop active indication 32 to indicate that the processing circuitry is currently executing the program loop body of a zero-overhead loop. For example the zero-overhead loop active indication 32 may be a control flag maintained in the loop control parameter store 22 or elsewhere in the processing apparatus 2. Alternatively, execution of a zero-overhead loop control instruction could be detected based on a signal provided by other parts of the processing pipeline, such as the processing circuitry 8. Also, the zero-overhead loop detection circuitry could also detect the presence of a zero-overhead loop based on the loop control parameters. For example, the zero-overhead loop detection circuitry 30 could be prompted to set the zero-overhead loop active indication 32 in response to detecting a zero-overhead loop end branch operation when the program flow returns to the start of the program loop body, which as shown in FIG. 2 could occur either in response to execution of a LE loop end instruction or could occur automatically as prompted by the loop control circuitry 20 based on the loop control parameters.

Optionally, the branch prediction disabling circuitry 24 may have branch monitoring circuitry 34 which monitors decoded instructions and/or branch outcomes of executed branch instructions to detect the presence of branch instructions (or in some cases, more specifically, taken branch instructions) within the program loop body when the zero-overhead loop active indication 32 indicates that the processing circuitry is currently processing and zero-overhead loop. Based on the monitoring of the occurrence of branch instructions, the branch monitoring circuitry 24 determines whether a predetermined condition is satisfied. The predetermined condition may be determined to be satisfied if the branch monitoring indicates that the relative proportion of (taken) branch instructions within the program loop body or within multiple iterations of the program loop body is less than a certain threshold.

Branch predictor disable determination circuitry 36 uses the zero-overhead loop active indication 32 and, if available, the branch monitoring information indicative of whether the predetermined condition is satisfied, to determine whether to disable the branch prediction circuitry 12. If the zero overhead loop active indication 32 indicates that processing circuitry 8 is currently executing the program loop body of the zero-overhead loop and (if available) the predetermined condition is indicated to be satisfied, then the branch predictor disable determination circuitry 36 disables the branch prediction circuitry 12. If the branch monitoring circuitry 34 is not provided then the branch predictor disable determination circuitry 36 could simply disable the branch prediction circuitry 12 when the zero-overhead loop active indication 32 indicates that processing is being performed within a program loop body of the zero-overhead loop, independent of any monitoring of occurrence of branch instructions within the program loop body.

Hence, the branch prediction circuitry 12 can be disabled if the body of a zero overhead loop doesn't contain any branches (as these loops don't benefit from branch prediction). The presence of branches in the loop can be detected by setting a branch detection flag (separate from the zero-overhead loop active indication 32) if a zero overhead loop is being executed and a branch instruction is executed. After the whole loop body has been executed once with this checking enabled, subsequent iterations of the loop can be executed without the branch predictor if the flag has not been set.

Some zero overhead loops may contain a branch that implements a "break" condition to exit the loop, or for error handling. As these branches may only be taken on the last iteration, or only in very rare circumstances, it may be advantageous to further improve the branch detection so that the branch occurrence flag is only set for taken branches where the branch predictor could provide a benefit on subsequent iterations of the loop.

Another option, rather than merely setting a branch occurrence flag on detection of a branch, can be to count the number of branches (or taken branches) in a loop body, together with the total number of instructions. For processors with relatively short pipelines it may be advantageous to take a small performance hit to save power if the number of branches in the loop is a small proportion of the loop size. The particular threshold for deciding based on the detected branch monitoring metric whether to disable the branch predictor 12 may be controlled by a configuration bit so the end user can choose whether to optimise for power or performance.

The branch detection depends on knowing whether the body of a zero overhead loop is being executed, The zero-overhead loop active indication (e.g. a flag) 32 indicating whether a zero-overhead loop is being executed can be set as follows:

Set if the optional loop start instruction LS is executed

Set if a loop end instruction LE is executed and more iterations of the loop are required. This handles the case when there is no loop start LS instruction, and when resuming execution of a zero overhead loop after returning from an exception, such as an interrupt (alternatively, or in addition, the flag 32 can be set when the loop control circuitry 20 triggers a branch back to the start of the program loop body based on the loop control parameters).

Clear the flag 32 if a loop end instruction LE is executed and there are no more iterations of the loop to perform.

Clear the flag 32 if the loop control circuitry 20 determines that there are no more iterations of the program loop body to perform.

Clear the flag 32 if an exception, such as an interrupt causes execution of a zero-overhead loop to be stopped in order to execute an exception handler, such as an interrupt handler.

An alternative way of implementing this invention would be to assume zero overhead loops by default do not contain taken branches and disable the branch predictor as soon as a zero overhead loop is detected (e.g. based on the loop start instruction, the loop end instruction or the implicit branch to the start of the loop body that is triggered by the loop control circuitry 20). The branch predictor could be re-enabled if a (taken) branch is subsequently detected, or the last iteration of the loop completes. This may be beneficial in situations where only a small number of loop iterations are performed as the branch predictor 22 can be disabled even for loops with a number of iterations which is smaller than the number of iterations taken to learn whether there are any taken branches in the program loop body.

Figure 5:
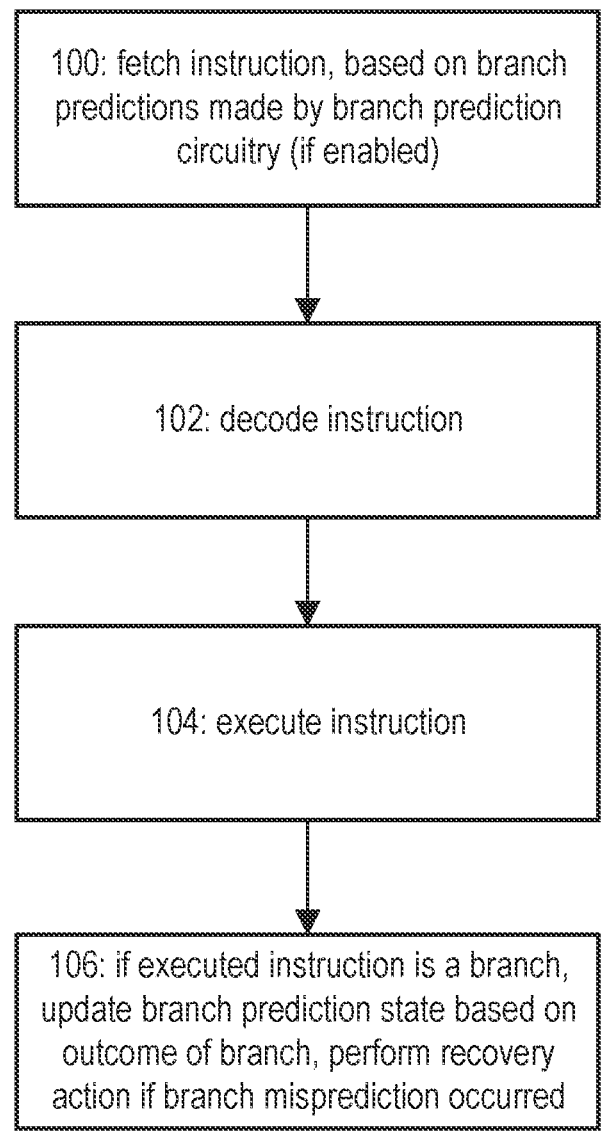
FIG. 5 is a flow diagram illustrating processing of instructions.

FIG. 5 is a flow diagram illustrating processing of instructions using the data processing apparatus 2. At step 100, the instruction fetch circuitry 4 fetches the next instruction to be processed, based on the predictions made by the branch prediction circuitry 12 if enabled. At step 102, the instruction decoding circuitry 6 decodes the instruction fetched by the instruction fetch circuitry 4. At step 104, the processing circuitry 8 executes the instruction decoded by the instruction decoding circuitry 6, to carry out the processing operation represented by the instruction. At step 106, if the executed instructions are branch instruction, branch prediction state maintained within the branch prediction structures 14 of the branch prediction circuitry 12 is updated based on the outcome of the branch instruction determined by the processing circuitry 8. If a branch misprediction occurs, a recovery action is taken (e.g. flushing subsequent instructions and refetching from the correct point of program execution). For example, the branch misprediction could occur if the determined branch outcome for a branch instruction differs from an outcome predicted at the branch prediction circuitry 12 for the branch instruction. Also, the branch misprediction could occur if the branch prediction circuitry 12 predicted a taken branch and subsequently when the instruction is decoded at step 102 it was determined that the instruction was not a branch. While FIG. 5 shows a flow diagram illustrating a sequential series of steps, it will be appreciated that processing of instructions is pipelined and so, as shown in the example of FIG. 3, other instructions may be being processed in parallel with the processing of the instruction shown in FIG. 5, so that what instruction can be at one pipeline stage well another instruction is being processed at another pipeline stage.

Figure 6:
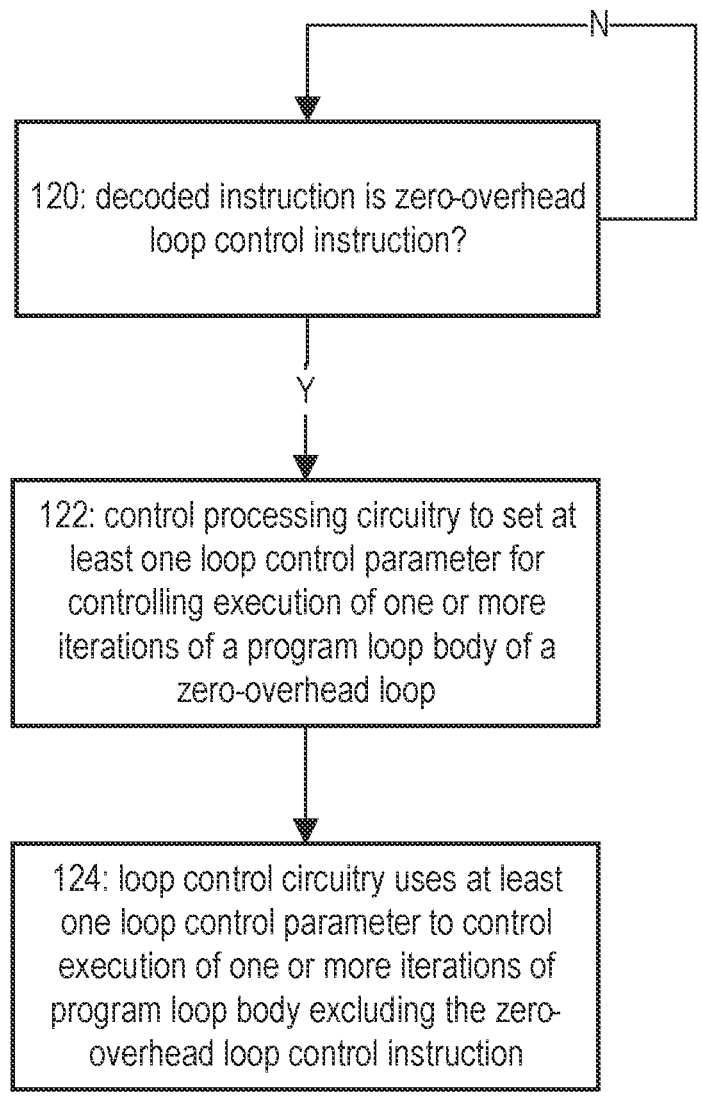
FIG. 6 is a flow diagram illustrating processing of a zero-overhead loop control instruction.

FIG. 6 is a flow diagram illustrating processing of the zero-overhead loop control instruction. At step 120, the instruction decoding circuitry 6 checks the instruction encoding of the next instruction to be decoded and determines whether that instruction is a zero-overhead loop control instruction. If not, then the instruction decoding circuitry 6 generates control signals to control the processing circuitry 8 to process another type of instruction, and the method returns to step 12 to decode the next instruction. If the decoded instruction is a zero-overhead loop control instruction then at step 122 the processing circuitry 8 is controlled to set at least one loop control parameter for controlling execution of one or more iterations of the program loop body of the zero-overhead loop. For example, the processing circuitry 8 may update the one loop control parameter store 22 to store a value indicating a branch trigger address at which a branch is to be triggered on a subsequent loop iteration and a value indicating a loop start address representing the instruction at the start of the program loop body to which a branch is to be triggered when program execution reaches the branch trigger address. At step 124 the loop control circuitry 20 uses the at least one loop control parameter to control execution of the one or more iterations of the program loop body of the zero-overhead loop. When the loop control circuitry 20 controls instruction fetch circuitry 4 to fetch the instructions according to one or more iterations of the program loop body, the zero-overhead loop control instruction itself is excluded from the program loop body so that it will not be fetched on remaining iterations of the program loop.

Figure 7:
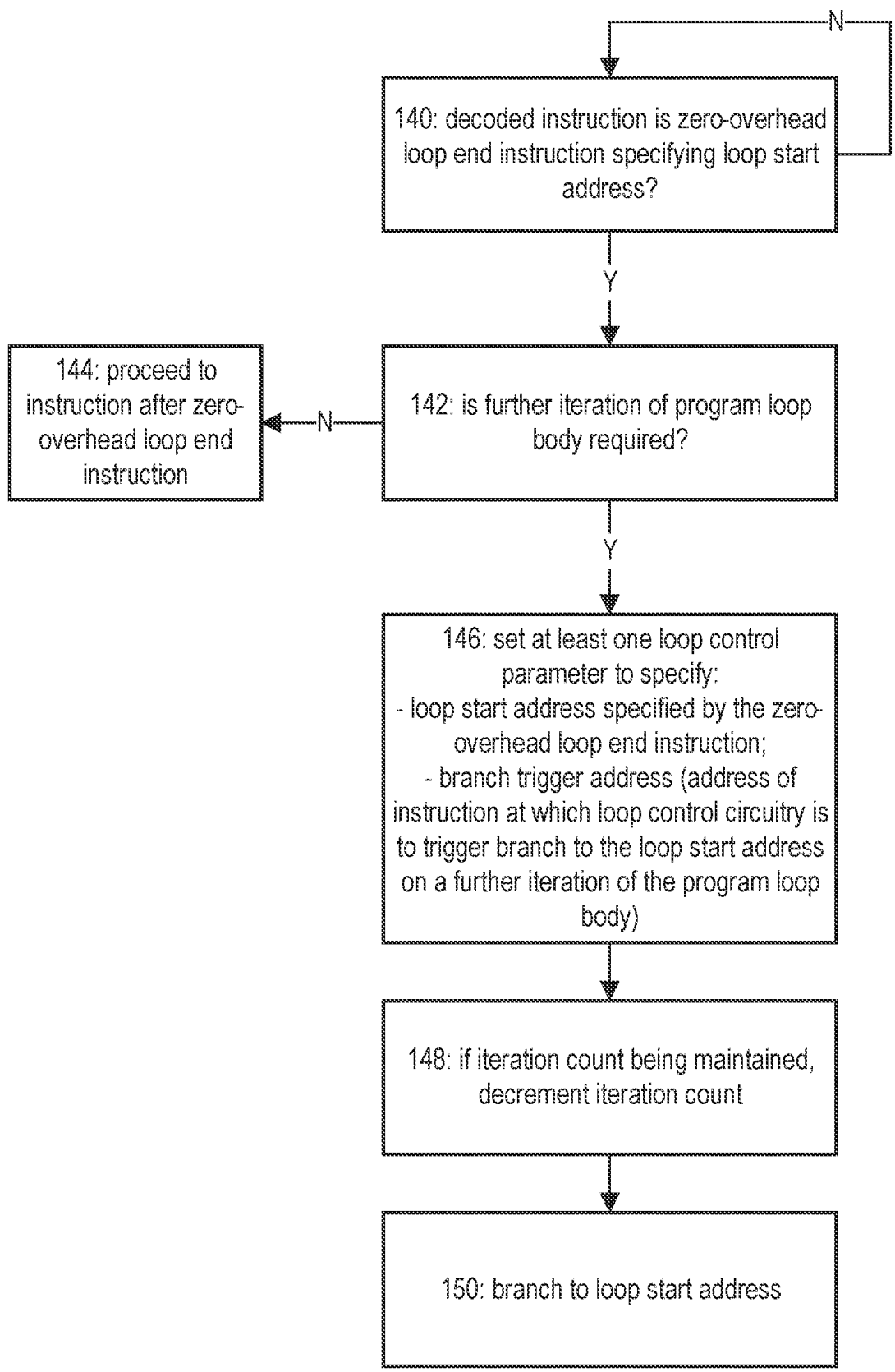
FIG. 7 is a flow diagram illustrating processing of a zero-overhead loop end instruction.

FIG. 7 is a flow diagram showing in more detail processing of a particular example of the zero-overhead loop control instruction, which is the zero-overhead loop end instruction LE mentioned above. At step 140 the instruction decoding circuitry 6 detects, based on the encoding of the next instruction to be decoded, whether the next instruction is the zero-overhead loop end instruction LE. Again, if the instruction being decoded is not the zero-overhead loop end instruction then control signals are generated to control the processing circuitry 8 to perform another type of processing operation. If the decoded instruction is the zero-overhead loop end instruction LE, the instruction specifies a value indicating a loop start address.

If the zero-overhead loop end instruction is identified by the instruction decoding circuitry 6, then at step 142 the processing circuitry 8, under control of the instruction decoding circuitry 6, determines whether a further iteration of the program loop body will be required, For example, if the loop iteration count parameter is being maintained (e.g. in the link register) then the loop iteration count parameter may be used to determine whether a further iterations required. For while loops (for which the loop start instruction may not have been provided) such a loop iteration count parameter may not be maintained and in that case the processing circuitry 8 may determine by default that a further iteration of the program loop body may be required if there is no indication of how many remaining iterations are needed. If it is determined that no further iteration of the program loop body is required then at step 144 program flow is allowed to proceed to the next instruction after the zero-overhead loop end instruction LE.

If it is determined at step 142 that a further iteration of the program loop body is required, then at step 146 the processing circuitry 8 sets the at least one loop control parameter to specify values indicating a loop start address as specified by the operands of the zero-overhead loop end instruction and a branch trigger address which could either be implicitly defined as the address of the instruction preceding the zero-overhead loop end instruction or could be specified by an operand of the zero-overhead loop end instruction. The branch trigger address represents an address of an instruction at which the loop control circuitry 20 is, for further iterations of the program loop body, to trigger a branch to the instruction at the loop start address.

At step 148, if an iteration count tracking the number of remaining iterations of the program loop body is being maintained, then the iteration count is decremented (for example the value stored in the link register can be decremented). At step 150, the processing circuitry 8 triggers a branch to the instruction at the loop start address. Hence, if the instruction at the loop start address has not already been fetched by the instruction fetch circuitry 4, the instruction fetch circuitry 4 is controlled to fetch that instruction and if any other instructions have already been fetched following the loop end instruction then these instructions are flushed from the pipeline.

Figure 8:
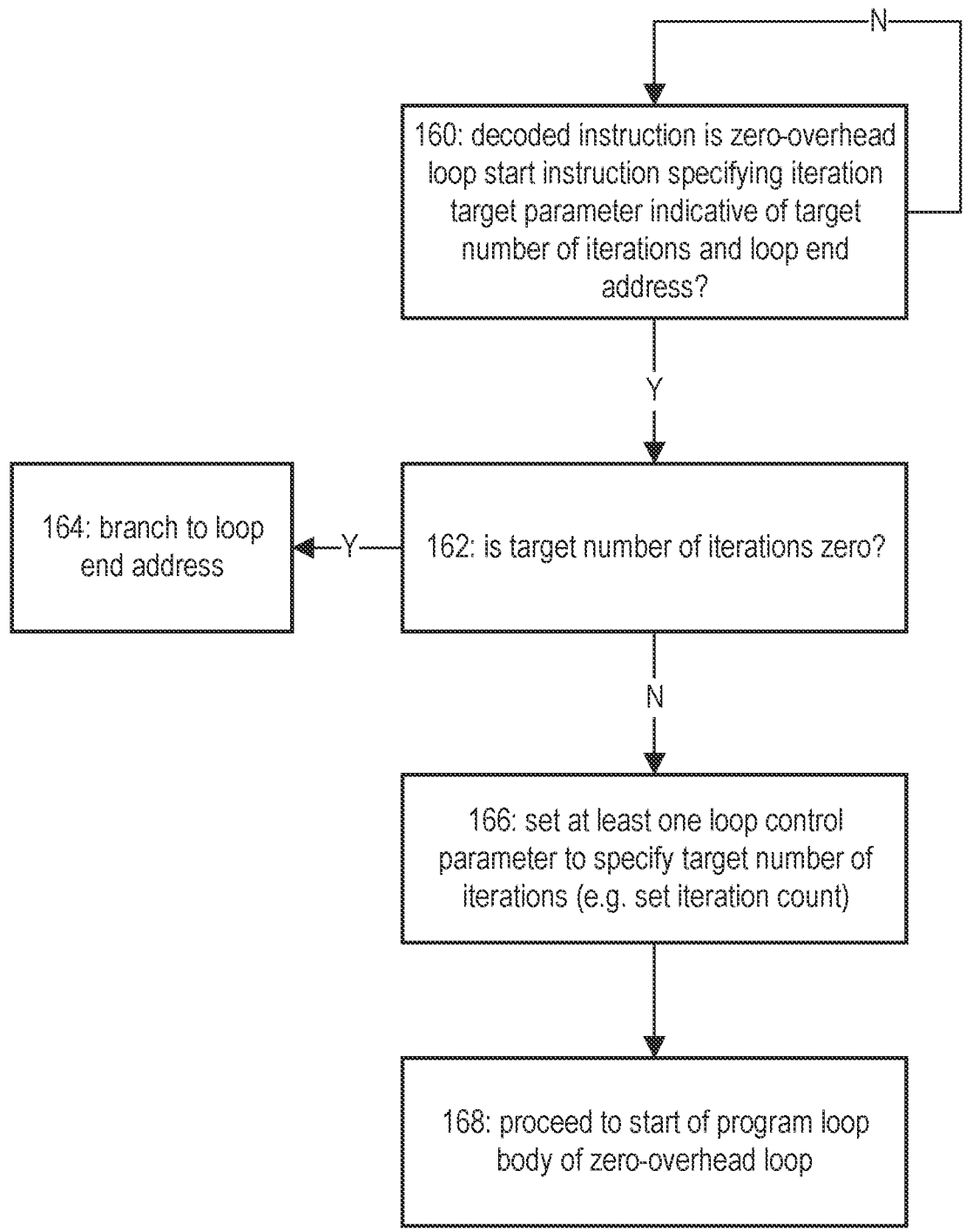
FIG. 8 is a flow diagram illustrating processing of a zero-overhead loop start instruction.

FIG. 8 is a flow diagram illustrating processing of another example of a zero-overhead loop control instruction, which is the zero-overhead loop start instruction LS mentioned above. At step 160, the instruction decoding circuitry 6 detects whether the next instruction to be decoded is the zero-overhead loop start instruction. If not then again the instruction decoding circuitry 6 generates control signals for controlling the processing circuitry 8 to perform a different type of operation other than the zero-overhead loop start operation. If the decoded instruction is the zero-overhead loop start instruction then the instruction specifies an iteration target parameter indicative of a target number of iterations to be performed for a subsequent program loop body, and a value indicative of a loop end address representing address to which a branch can be made if the target number of iterations is zero.

In response to decoding of the zero-overhead loop start instruction, at step 162 the processing circuitry 8 determines whether the target number of iterations indicated by the iteration target parameter is zero. If the target number of iterations is zero, then at step 164 the processing circuitry 8 triggers a branch to the instruction at the loop end address identified based on an operand of the zero-overhead loop start instruction. If necessary, subsequent instructions already fetched beyond the zero-overhead loop start instruction can be flushed and the instruction fetch circuitry 4 may resume fetching of instructions from the instruction at the loop end address.

If at step 162 the target number of iterations was determined to be greater than zero, then there is no need to trigger the branch. At step 166 the processing circuitry 8 may set at least one loop control parameter to specify the target number of iterations. For example, the iteration count value mentioned above may be written to the link register or to another location. At step 168, the processing circuitry 8 allows program flow to proceed to the start of the program loop body of the zero-overhead loop.

Figure 9:
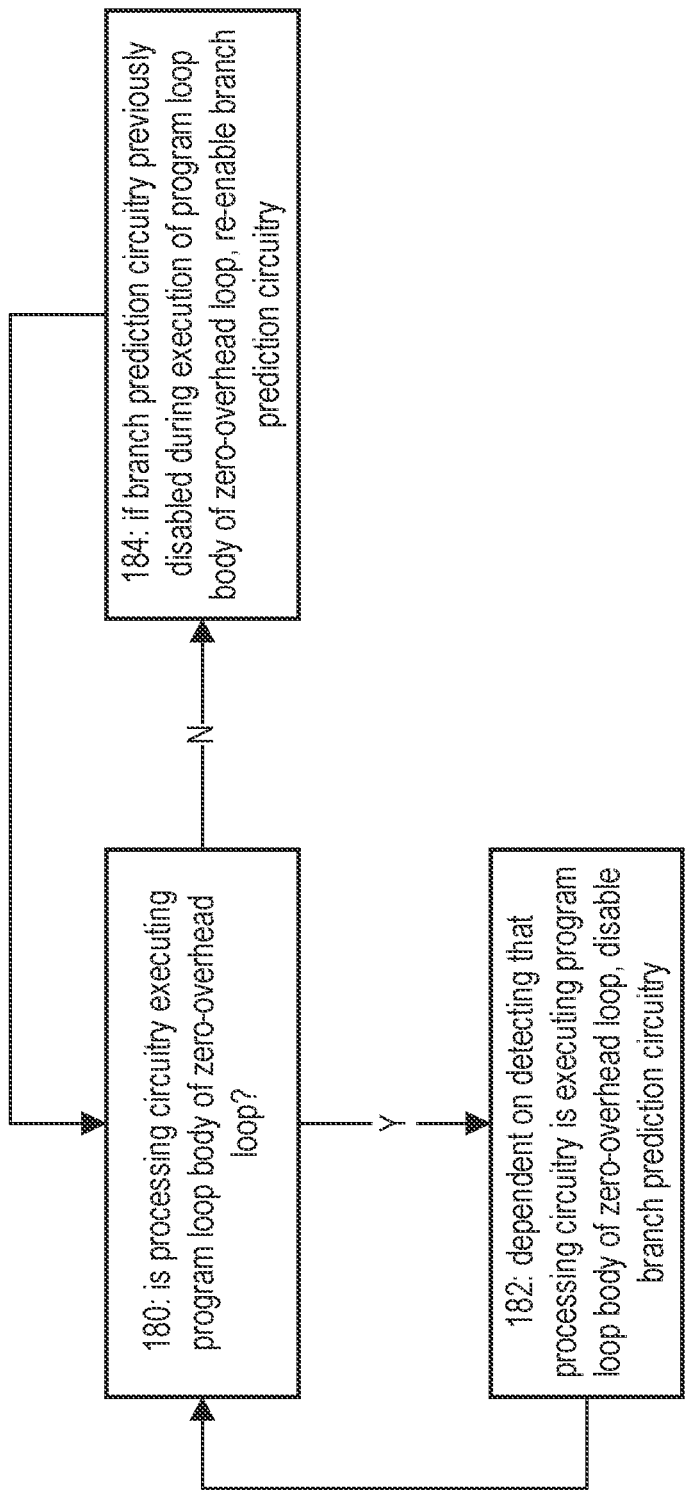
FIG. 9 is a flow diagram illustrating disabling of branch prediction circuitry when it is detected that the processing circuitry is executing a program loop body of a zero-overhead loop.

FIG. 9 is a flow diagram illustrating branch prediction disabling by the branch prediction disabling circuitry 24. At step 180, the branch prediction disabling circuitry 24 detects whether the processing circuitry is executing the program loop body of a zero-overhead loop that is associated with the execution of at least one architecturally defined zero-overhead loop control instruction. If the processing circuitry is executing the program loop body of the zero-overhead loop, then at step 182 the branch prediction disabling circuitry 24, dependent on detecting that the processing circuitry 8 is executing the program loop body of the zero-overhead loop, disables the branch prediction circuitry 12 to reduce power consumption by reducing the number of lookups to the branch prediction structures 14 and/or reducing toggling of the bits in circuit wires and storage elements due to training of branch prediction state. If at step 180 the processing circuitry 8 is detected not to be executing the program loop body of the zero-overhead loop, then at step 184, if the branch prediction circuitry 12 was previously disabled during execution of a program loop body of the zero-overhead loop, the branch prediction disabling circuitry 24 re-enables the branch prediction circuitry 12.

Figure 10:
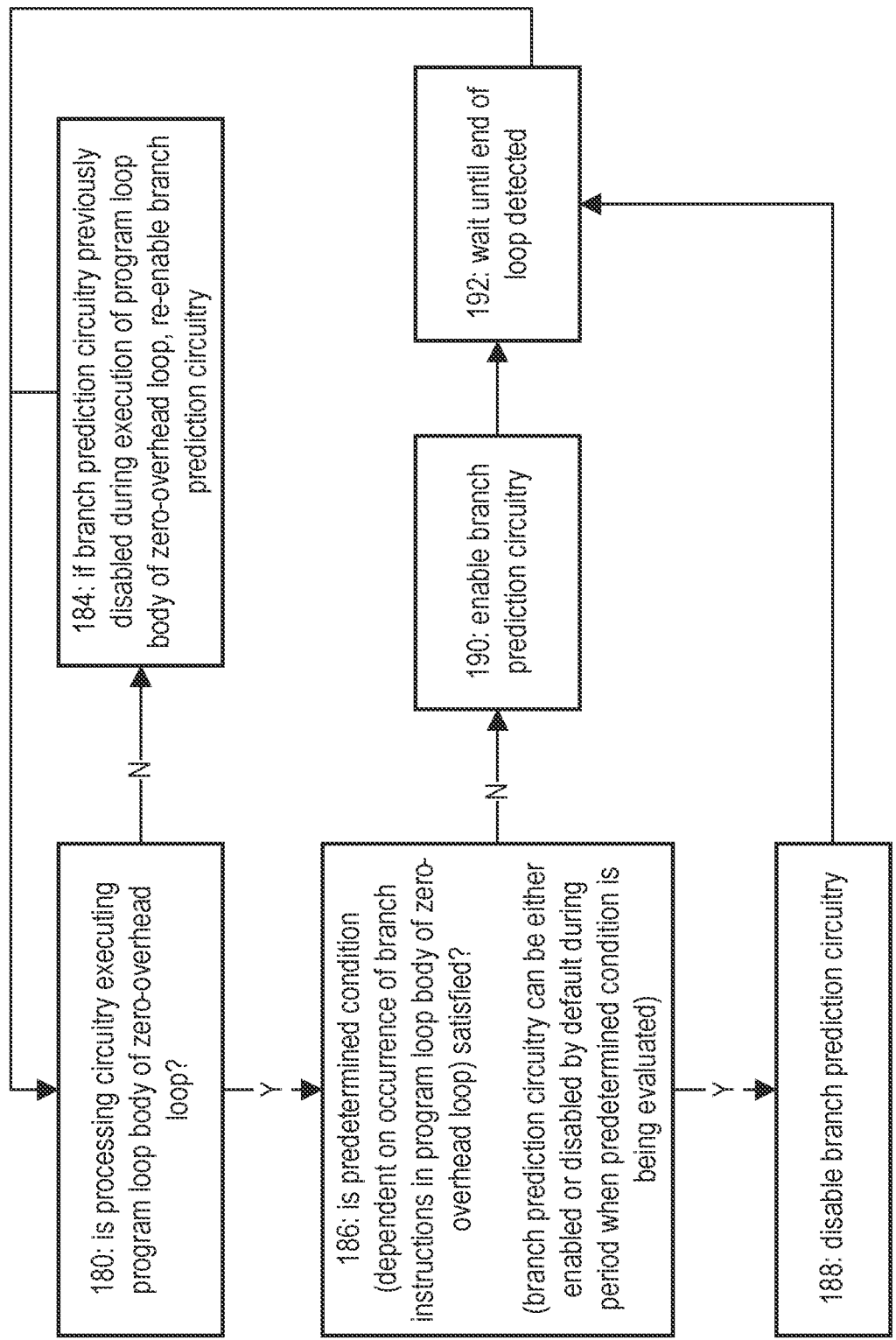
FIG. 10 is a flow diagram illustrating a further example of controlling disabling of branch prediction circuitry in a zero-overhead loop, based on whether a predetermined condition is satisfied.

FIG. 10 shows an alternative variants of branch prediction disabling by the branch prediction disabling circuitry 24. Steps 180 and 184 are the same as in FIG. 9. However, in FIG. 10 if at step 180 the processing circuitry 8 is determined to be executing the program loop body of a zero-overhead loop then at step 186 the branch prediction disabling circuitry 24 determines whether a predetermined condition is satisfied. The predetermined condition depends on the monitoring of occurrence of branch instructions in the program loop body of the zero-overhead loop by the branch monitoring circuitry 34. During a period while the occurrence of branch instructions is being monitored, the branch prediction circuitry 12 can either be enabled or disabled by default. Either way, once sufficient monitoring of the occurrence of branch instructions has been carried out, the branch prediction disabling circuitry 24 may determine whether the predetermined condition is satisfied. For example the predetermined condition may be considered satisfied if no branch instructions are detected within the program loop body of the zero-overhead loop, or if no taken branches are detected within the program loop body of the zero-overhead loop. The evaluation of the predetermined condition could also be based on a more complex metric of occurrence of branch instructions. Various examples of evaluating the predetermined condition are shown in FIGS. 13 to 16 discussed below. If the predetermined condition is determined to be satisfied (indicating the occurrence of relatively few branches, for example), then at step 188 the branch prediction circuitry 12 is disabled by the branch prediction disabling circuitry 24. If the predetermined condition is determined not to be satisfied (indicating the occurrence of a larger number of branches) then at step 190 the branch prediction circuitry 12 is enabled. Either way, after step 188 or 190, at step 192 the branch prediction disabling circuitry 24 waits until the end of the zero-overhead loop is detected (to save power by not continually re-evaluating the predetermined condition at step 186 for subsequent iterations once it has been established that the condition is or is not satisfied). Once the loop is complete, the method returns to step 180 to await a further instance of execution of a zero-overhead loop.

Figure 11:
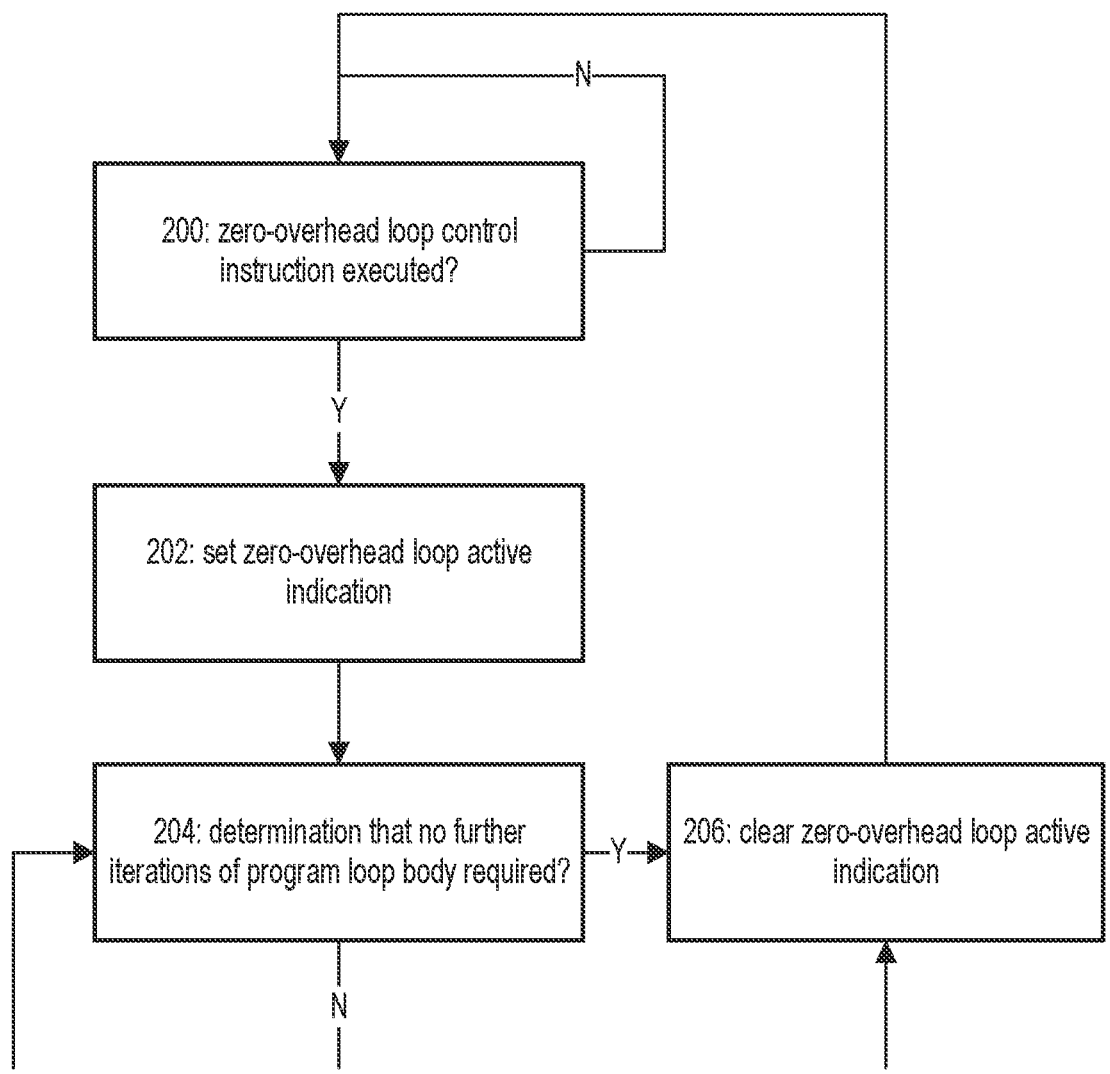
FIG. 11 is a flow diagram illustrating a first example of detection of whether the processing circuitry is processing a program loop body of a zero-overhead loop.
Figure 11:
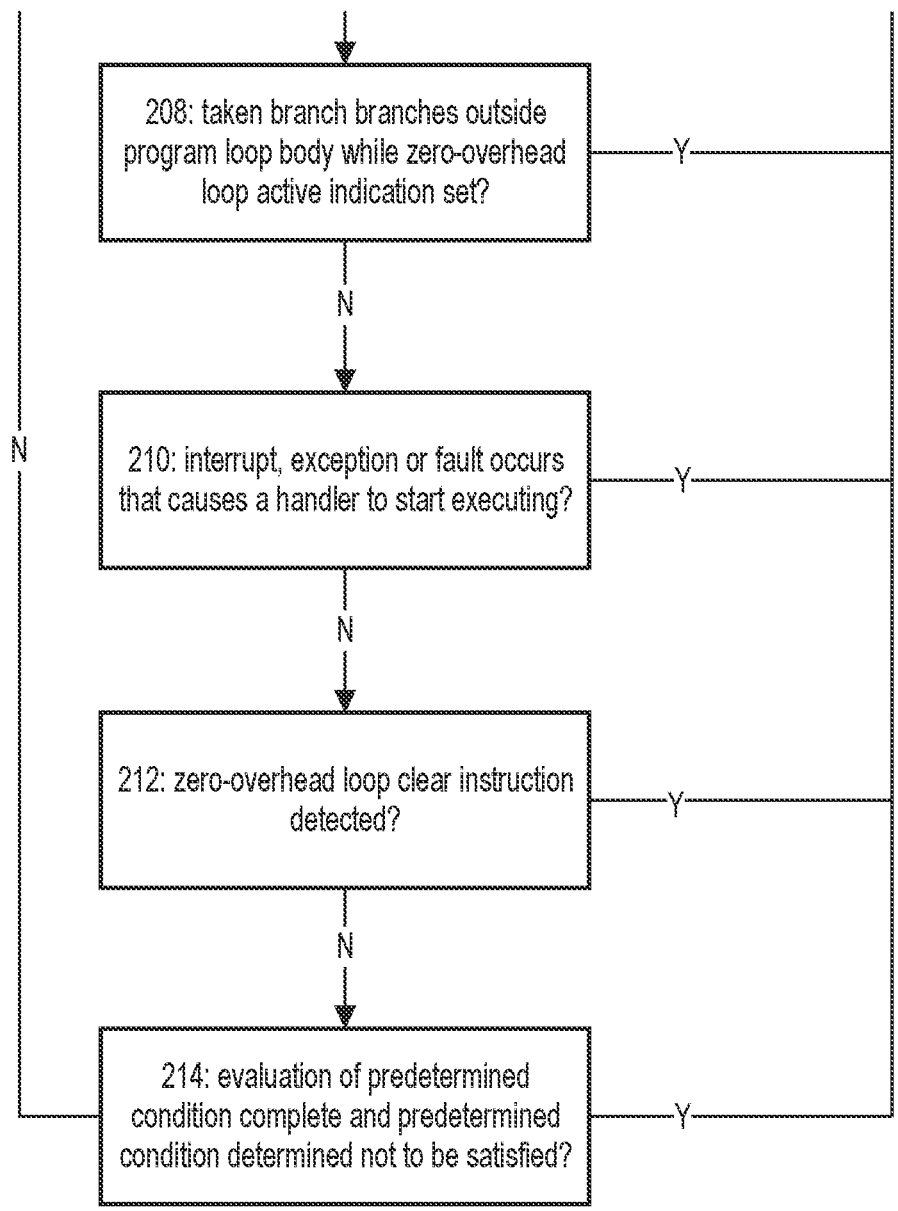

FIG. 11 is a flow diagram illustrating a first example of maintaining the zero-overhead loop active indication 32. At step 200, the zero-overhead loop detection circuitry 30 detects whether a zero-overhead loop control instruction is to be executed and if not then continues to monitor for execution of the zero-overhead loop control instruction. For example, the zero-overhead loop control instruction could be detected based on a signal provided by the instruction decoding circuitry 6 or the processing circuitry 8 when encountering such a zero-overhead loop control instruction. At step 202, in response to detecting that the zero-overhead loop control instruction is to be executed or has been executed, the zero-overhead loop detection circuitry 30 sets the zero-overhead loop active indication 32 to indicate that the processing circuitry is processing the program loop body of a zero-overhead loop.

At step 204 the zero-overhead loop detection circuitry 30 detects whether it has been determined that no further iterations of the program loop body are required for the current zero-overhead loop, and if so then at step 206 the zero-overhead loop active indication is cleared to indicate that the processing circuitry 8 is no longer executing the program loop body of the zero-overhead loop.

Otherwise, at step 208 the zero-overhead loop detection circuitry 30 detects whether a taken branch occurs which branches to an address of an instruction outside the program loop body. For example, this can be detected when the branch target address of the taken branch is not within the range bounded by the loop start address and branch trigger address indicated by the loop control parameters. If a taken branch branches outside the program loop body while the zero-overhead loop active indication 32 is set, then again at step 206 the zero-overhead loop active indication 32 is cleared to indicate that the processing circuitry 8 is no longer executing the program loop body of the zero-overhead loop.

Otherwise, at step 210 the zero-overhead loop detection circuitry 30 detects whether an interrupt, exception or fault occurs that causes a handler routine to start executing, and if so then again at step 206 the zero-overhead loop active indication 32 is cleared.

Otherwise, at step 212 the zero-overhead loop detection circuitry 30 determines whether a zero-overhead loop clear instruction has been detected. An ISA may support a zero-overhead loop clear instruction which when executed may cause the loop control parameters to be cleared (e.g. invalidated or discarded) from the loop control parameter store 22, so that the loop control branch will no longer occur the next time program flow reaches the previously indicated branch trigger address, and program flow instead proceeds to the following instruction after the zero-overhead loop. Hence, the loop clear instruction can be a sign that the zero-overhead loop is no longer executing (or soon will no longer be executing), and so in response to detecting the zero-overhead loop clear instruction, again at step 206 the zero-overhead loop active indication is cleared.

Otherwise, at step 214 the zero-overhead loop detection circuitry 30 determines whether evaluation of the predetermined condition is complete (this is the predetermined condition as shown in FIG. 10, which depends on occurrence of (taken) branches in the program loop body, and is evaluated to decide whether to enable or disable the branch prediction circuitry during the zero-overhead loop). If evaluation of the predetermined condition is complete and the predetermined condition is determined not to be satisfied (i.e. a sufficient frequency of taken branches was identified to justify enabling the branch prediction circuitry while processing of the zero-overhead loop is still ongoing), then again at step 206 the zero-overhead loop active indication can be cleared. This can be a simple implementation for re-enabling the branch prediction circuitry 12 when it is determined that the predetermined condition is not satisfied—the flag which indicates the presence of zero-overhead loop can simply be cleared so that the branch prediction circuitry then behaves as if the zero-overhead loop had never been detected. Step 214 is optional, as in some implementations there may be no support for detecting the predetermined condition at all, and other implementations which do support detecting the predetermined condition to determine whether to enable/disable the branch prediction circuitry could nevertheless maintain separate tracking indications of whether the zero-overhead loop is active and whether, during an active zero-overhead loop, the branch prediction circuitry is to be enabled or disabled.

If none of the conditions detected at steps 204, 208, 210, 212, 214 have occurred then the method continues to loop through the steps to check for occurrences of one of these conditions, and in the meantime the zero-overhead loop active indication 32 will continue to be set to indicate execution of a program loop body of the zero-overhead loop. Eventually one of these events may occur and then the zero-overhead loop active indication may be clears. It will be appreciated that these conditions could be checked in a different order to the one shown in FIG. 11 or could be checked in parallel. Also, it will be appreciated that other events could also trigger the clearing of the zero-overhead loop active indication 32. Also, it will be appreciated that not all of the checks shown in steps 204, 208, 210, 212, 214 need to be implemented in a particular implementation, and some implementations could only implement a subset of these checks.

Figure 12:
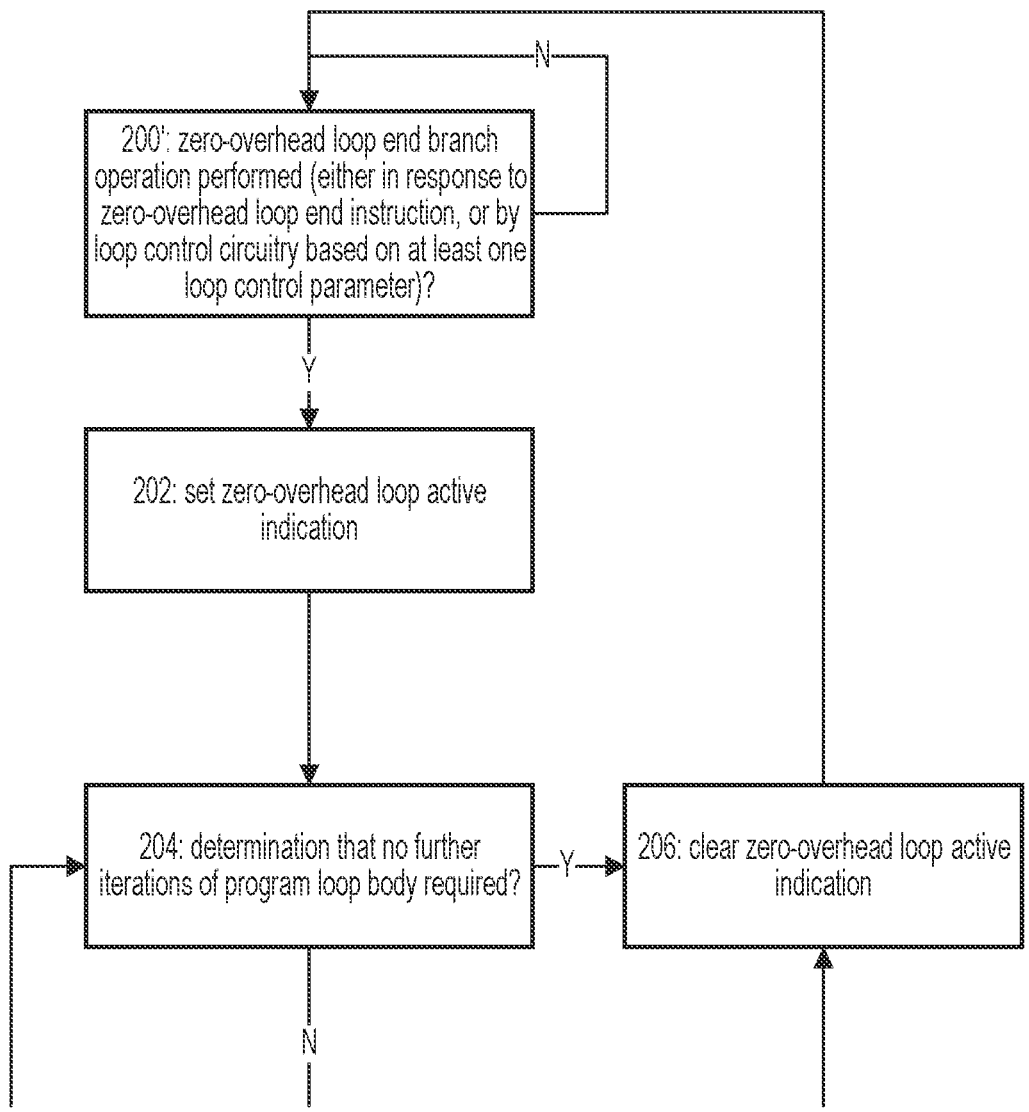
FIG. 12 is a flow diagram illustrating a second example of detection of whether the processing circuitry is processing a program loop body of a zero-overhead loop.
Figure 12:
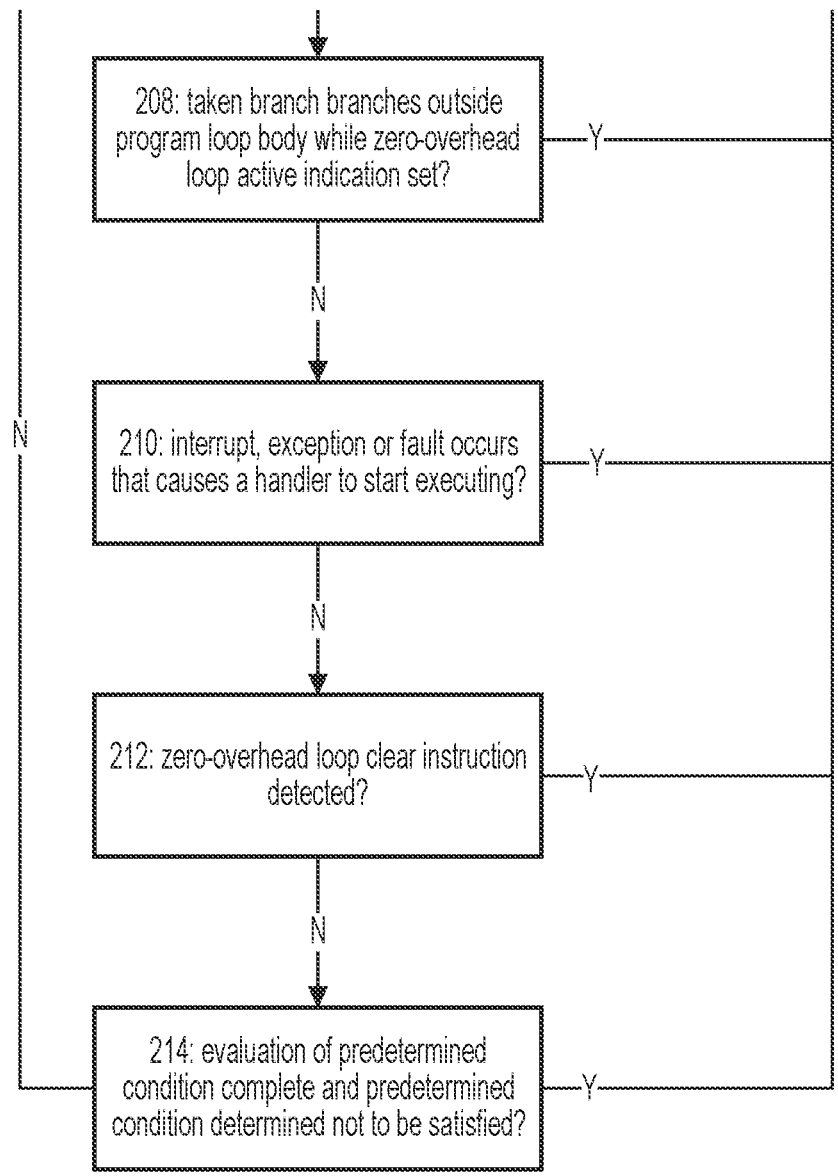

FIG. 12 shows an alternative example for maintaining the zero-overhead loop active indication 32, which could be used instead of FIG. 11. Steps 202 to 214 are the same as in FIG. 11. Step 200 of FIG. 11 is replaced with step 200' in FIG. 12, at which the zero-overhead loop detection circuitry 30 detects whether a zero-overhead loop end branch operation is being performed. This operation can be performed either in response to execution of the zero-overhead loop end instruction LE, or could be triggered automatically by the loop control circuitry 20 based on the at least one loop control parameter. Hence, with this approach the processing of the zero-overhead loop control instruction does not necessarily lead to the zero-overhead loop active indication 32 being set, unless it also triggers the loop end branch operation to branch back to the start of the program loop body. The occurrence of the loop end branch operation may be seen as a consequence of execution of the zero-overhead loop control instruction, so can act as a trigger for the presence of the execution of the zero-overhead loop to be detected. Other than step 200', FIG. 12 is the same as FIG. 11.

FIGS. 13 to 16 are flow diagrams illustrating various examples of evaluating whether the predetermined condition is satisfied at step 186 of FIG. 10. When the predetermined condition is satisfied then the branch prediction circuitry 12 can be disabled while the processing circuitry 8 is executing the program loop body of the zero-overhead loop.

Figure 13:
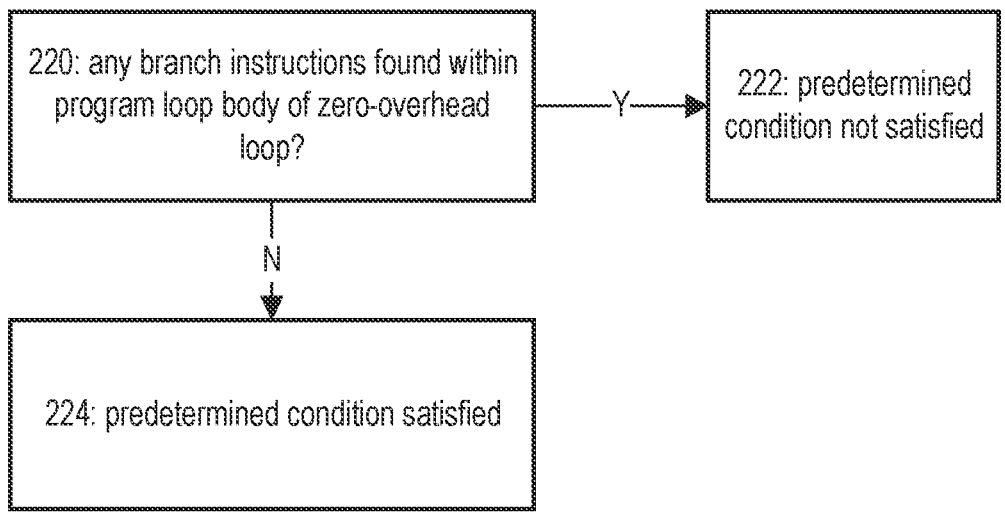
FIGS. 13 to 16 are flow diagrams illustrating a number of examples of detection of whether a predetermined condition, for controlling whether the branch prediction circuitry is disabled in a zero-overhead loop, is satisfied.

At step 220 of FIG. 13, the branch monitoring circuitry 34 determines whether any branch instructions have been found within the program loop body of the zero-overhead loop. For example, this can be detected by setting a branch detection flag, if a branch instruction is encountered while the zero-overhead loop active indication 32 is set to indicate execution of the program loop body of the zero-overhead loop. In response to detecting the branch within the program loop body of the zero-overhead loop, at step 222 the branch monitoring circuitry 34 determines that the predetermined condition is not satisfied. If no branch instructions are detected then at step 224 the predetermined condition is determined to be satisfied.

Figure 14:
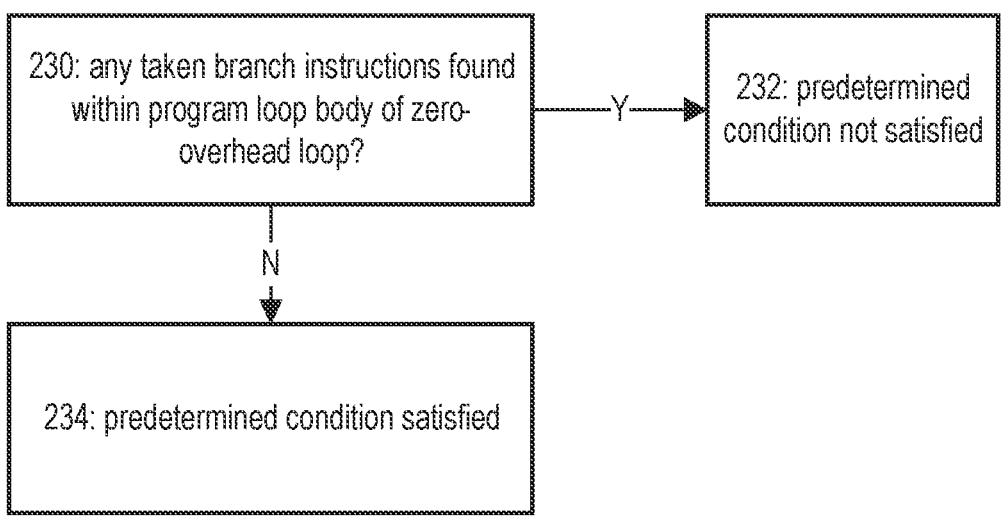

FIG. 14 shows a variant of the approach shown in FIG. 13, in which step 230 is the same as at step 220 of FIG. 13, except that the detection is of whether any taken branch instruction is found within the program loop body of the zero-overhead loop, instead of detecting a branch instruction in general. Hence, while in FIG. 13 a not taken branch may lead to the predetermined condition not being satisfied, in FIG. 14 not taken branches are not considered as preventing disabling of the branch prediction circuitry 12. Hence, if at step 238 it is determined that there are no taken branch instructions within the program loop body of the zero-overhead loop, then at step 234 the branch monitoring circuitry 34 determines that the predetermined condition is satisfied. If any taken branch instructions are found within the program loop body then at step 232 the branch monitoring circuitry 34 determines that the predetermined condition is not satisfied.

Figure 15:
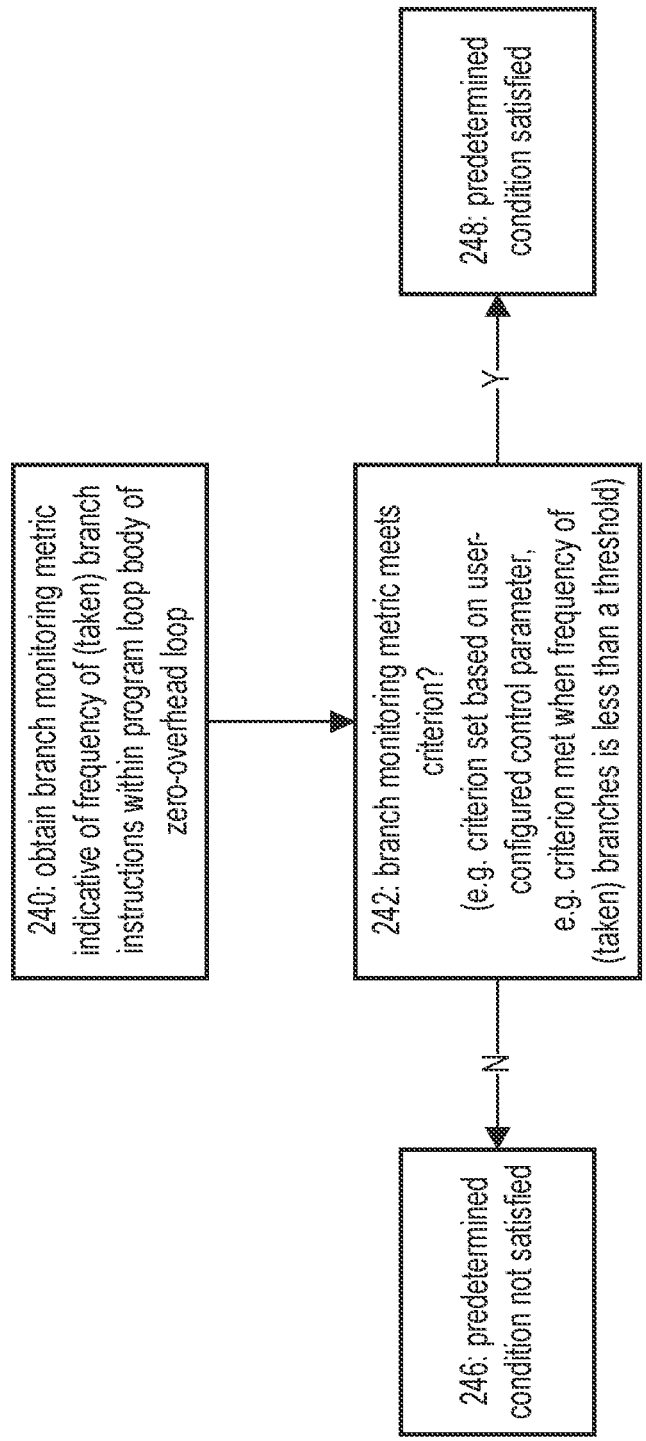

FIG. 15 shows another example in which, at step 240, the branch monitoring circuitry 34 obtains a branch monitoring metric indicative of a frequency of (taken) branch instructions within the program loop body of the zero-overhead loop. Some implementations may determine the branch monitoring metric based on the frequency of both taken and not taken branch instructions, while other implementations may only consider taken branch instructions as contributing to the branch monitoring metric. In some examples, the branch monitoring metric could count the absolute number of (taken) branch instructions. Other examples may express the branch monitoring metric as a fraction of the total number of instructions within a single iteration of the program loop body or the combined total number of instructions executed within two or more iterations of the program loop body. At step 242 the branch monitoring circuitry 34 determines whether the branch monitoring metric meets a predetermined criterion. This criterion could be set based on a user-configured control parameter. For example, the criterion could be considered satisfied when the frequency of (taken) branches is less than a certain threshold. If the criterion is satisfied by the branch monitoring metric then at step 248 it is determined that the predetermined condition is satisfied. Hence, if the frequency of branches or taken branches is relatively low then the predetermined condition may be satisfied and this may lead to the branch prediction circuitry 12 being disabled as the power cost of maintaining lookups in the branch prediction circuitry 12 may not be justified given the low occurrence of branches. If the branch monitoring metric does not meet the predetermined criterion then at step 246 the predetermined condition is determined not to be satisfied, and then this case the branch prediction circuitry 12 may be enabled.

Figure 16:
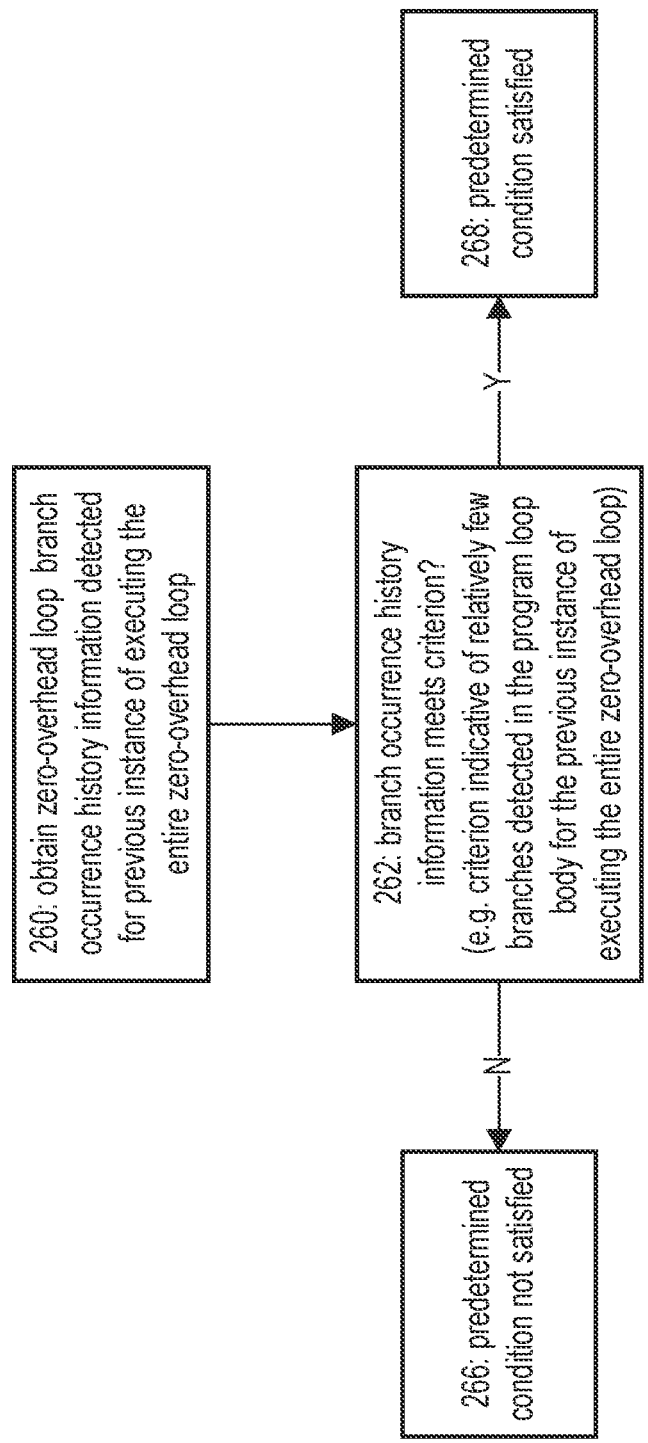

FIG. 16 shows another example of evaluating the predetermined condition, this time based on branch occurrence history information detected for a previous instance of executing the entire zero-overhead loop. At step 260 the zero-overhead loop branch occurrence history information is obtained by the branch monitoring circuitry 34. At step 262 the branch monitoring circuitry determines whether the branch occurrence history information meets the predetermined criterion. For example this criterion could be in indication that relatively few branches were detected in the program loop body the previous time the entire zero-overhead loop were executed. If the predetermined criterion is not satisfied then at step 266 the predetermined condition is determined not to be satisfied and so the branch prediction circuitry 12 may be enabled by the branch prediction disabling circuitry 24. If the predetermined criterion is considered to be satisfied by the branch occurrence history information then at step 268 the predetermined condition is determined to be satisfied and so the branch prediction circuitry 12 can be disabled. This approach allows the branch monitoring circuitry 34 to learn from previous attempts to execute the same zero-overhead loop before the current attempt, rather than only using information detected from earlier iterations of the current pass through the zero-overhead loop. This can help to allow the branch prediction circuitry 12 on some occasions to be disabled earner as in the initial iterations of the program loop body the branch prediction circuitry 12 could be disabled based on the history information even before sufficient iterations have been performed to allow the branch monitoring metric to determine whether there are sufficient branch instructions to justify continued enabling of the branch prediction circuitry 12.

It will be appreciated that FIGS. 13 to 16 are just some examples of ways in which the frequency of branches within the program loop body can be identified and other techniques are also possible.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may be define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may embody computer-readable representations of one or more netlists. The one or more netlists may be generated by applying one or more logic synthesis processes to an RTL representation. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function, "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
decoding circuitry to decode instructions defined according to an instruction set architecture;
processing circuitry to perform data processing in response to the decoded instructions, where, in response to the decoding circuitry decoding a zero-overhead loop control instruction of the instruction set architecture, the processing circuitry is configured to set at least one loop control parameter for controlling execution of one or more iterations of a program loop body of a zero-overhead loop;
loop control circuitry to control, based on the at least one loop control parameter, execution of the one or more iterations of the program loop body of the zero-overhead loop, the program loop body excluding the zero-overhead loop control instruction;
branch prediction circuitry to predict outcomes of branch instructions to be processed by the processing circuitry; and
branch prediction disabling circuitry to:
in response to identifying that the zero-overhead loop control instruction defined in the instruction set architecture is executed, or has been executed, by the processing circuitry, detect that the processing circuitry is executing the program loop body of the zero-overhead loop associated with the zero-overhead loop control instruction; and
dependent on detecting, in response to identifying that the zero-overhead loop control instruction defined in the instruction set architecture is executed or has been executed, that the processing circuitry is executing the program loop body of the zero-overhead loop, disable the branch prediction circuitry.

2. The apparatus according to claim 1, in which the branch prediction disabling circuitry is configured to re-enable the branch prediction circuitry in response to detecting that the processing circuitry is no longer executing the program loop body of the zero-overhead loop.

3. The apparatus according to claim 1, in which the zero-overhead loop control instruction comprises at least one of:
a zero-overhead loop start instruction for execution before a start of the program loop body; and
a zero-overhead loop end instruction for execution at an end of the program loop body.

4. The apparatus according to claim 1, in which, in response to the decoding circuitry decoding the zero-overhead loop control instruction, the processing circuitry is configured to:
at least when at least one further iteration of the program loop body is required, set the at least one loop control parameter to specify a value indicative of a loop start address and a value indicative of a branch trigger address, where the branch trigger address is indicative of an instruction at which a branch to the loop start address is to be triggered by the loop control circuitry for any further iteration of the program loop body.

5. The apparatus according to claim 1, in which the zero-overhead loop control instruction comprises a zero-overhead loop end instruction for execution at an end of the program loop body, the zero-overhead loop end instruction specifying a value indicative of a loop start address indicative of an instruction at a start of the program loop body; and
in response to the decoding circuitry decoding the zero-overhead loop end instruction, the processing circuitry is configured to:
determine whether at least one further iteration of the program loop body is required;
at least when the at least one further iteration of the program loop body is required, set the at least one loop control parameter to specify a value indicative of the loop start address and a value indicative of a branch trigger address indicative of an instruction at which a branch to the loop start address is to be triggered by the loop control circuitry for any further iteration of the program loop body;
when the at least one further iteration of the program loop body is required, branch to the loop start address.

6. The apparatus according to claim 1, in which the zero-overhead loop control instruction comprises a zero-overhead loop start instruction for execution before a start of the program loop body, the zero-overhead loop start instruction specifying an iteration target parameter indicative of a target number of iterations of the program loop body to be performed and a value indicative of a loop end address indicative of an instruction following an end of the program loop body; and
in response to the decoding circuitry decoding the zero-overhead loop start instruction, the processing circuitry is configured to:
determine based on the iteration target parameter whether the target number of iterations is zero; and
when the target number of iterations is determined to be zero, branch to the loop end address.

7. The apparatus according to claim 1, in which, in response to detecting that the processing circuitry is executing the program loop body of the zero-overhead loop, the branch prediction disabling circuitry is configured to detect whether a predetermined condition is satisfied depending on occurrence of one or more branch instructions within the program loop body of the zero-overhead loop, and to disable the branch prediction circuitry when the predetermined condition is satisfied.

8. The apparatus according to claim 7, in which the branch prediction disabling circuitry is configured to determine whether the predetermined condition is satisfied depending on a branch monitoring metric indicative of a frequency of occurrence of one of:
branch instructions within the program loop body of the zero-overhead loop; or
taken branch instructions within the program loop body of the zero-overhead loop.

9. The apparatus according to claim 8, in which the branch prediction disabling circuitry is configured to adjust, based on a user-configured control parameter, a criterion applied to the branch monitoring metric to determine whether the predetermined condition is satisfied.

10. The apparatus according to claim 7, in which the branch prediction disabling circuitry is configured to determine whether the predetermined condition is satisfied based on zero-overhead loop branch occurrence history information detected for a previous instance of executing the entire zero-overhead loop associated with a previous instance of the zero-overhead loop control instruction.

11. The apparatus according to claim 7 in which, during at least one initial iteration of the program loop body of the zero-overhead loop executed after detecting that the processing circuitry is executing the program loop body of the zero-overhead loop, the branch prediction disabling circuitry is configured to evaluate whether the predetermined condition is satisfied, and in response to determining that the predetermined condition is satisfied, to disable the branch prediction circuitry for any subsequent iteration of the program loop body of the zero-overhead loop.

12. The apparatus according to claim 7, in which, in response to detecting that the processing circuitry is executing the program loop body of the zero-overhead loop, the branch prediction disabling circuitry is configured to initially disable the branch prediction circuitry while evaluating whether the predetermined condition is satisfied, and re-enable the branch prediction circuitry in response to determining that the predetermined condition is unsatisfied.

13. The apparatus according to claim 1, in which the branch prediction disabling circuitry is configured to detect, based on a zero-overhead loop active indication, whether the processing circuitry is executing the program loop body of the zero-overhead loop associated with the zero-overhead loop control instruction.

14. The apparatus according to claim 13, in which at least one of:
in response to the processing circuitry executing the zero-overhead loop control instruction of the instruction set architecture, when at least one more iteration of the program loop body is required after execution of the zero-overhead loop control instruction, the branch prediction disabling circuitry is configured to set the zero-overhead loop active indication to indicate that the processing circuitry is executing the program loop body of the zero-overhead loop;
in response to a zero-overhead loop end branch operation being performed following a given iteration of the program loop body of the zero-overhead loop to branch to a start of the program loop body of the zero-overhead loop for a subsequent iteration, the branch prediction disabling circuitry is configured to set the zero-overhead loop active indication to indicate that the processing circuitry is executing the program loop body of the zero-overhead loop.

15. The apparatus according to claim 13, in which the branch prediction disabling circuitry is configured to clear the zero-overhead loop active indication in response to detecting that no further iterations of the program loop body of the zero-overhead loop are required.

16. An apparatus compromising:
decoding circuitry to decode instructions defined according to an instruction set architecture;
processing circuitry to perform data processing in response to the decoded instructions, where, in response to the decoding circuitry decoding a zero-overhead loop control instruction of the instruction set architecture, the processing circuitry is configured to set at least one loop control parameter for controlling execution of one or more iterations of a program loop body of a zero-overhead loop;
loop control circuitry to control, based on the at least one loop control parameter, execution of the one or more iterations of the program loop body of the zero-overhead loop, the program loop body excluding the zero-overhead loop control instruction;
branch prediction circuitry to predict outcomes of branch instructions to be processed by the processing circuitry; and
branch prediction disabling circuitry to:
  detect whether the processing circuitry is executing the program loop body of the zero-overhead loop associated with the zero-overhead loop control instruction; and
  dependent on detecting that the processing circuitry is executing the program loop body of the zero-overhead loop, disable the branch prediction circuitry; in which:
in response to detecting that the processing circuitry is executing the program loop body of the zero-overhead loop, the branch prediction disabling circuitry is configured to detect whether a predetermined condition is satisfied depending on occurrence of one or more branch instructions within the program loop body of the zero-overhead loop, and to disable the branch prediction circuitry when the predetermined condition is satisfied; and
the branch prediction disabling circuitry is configured to determine that the predetermined condition is satisfied when one of:
  there are no branch instructions within the program loop body of the zero-overhead loop; or
  there are no taken branch instructions within the program loop body of the zero-overhead loop.

17. An apparatus comprising:
decoding circuitry to decode instructions defined according to an instruction set architecture;
processing circuitry to perform data processing in response to the decoded instructions, where, in response to the decoding circuitry decoding a zero-overhead loop control instruction of the instruction set architecture, the processing circuitry is configured to set at least one loop control parameter for controlling execution of one or more iterations of a program loop body of a zero-overhead loop;
loop control circuitry to control, based on the at least one loop control parameter, execution of the one or more iterations of the program loop body of the zero-overhead loop, the program loop body excluding the zero-overhead loop control instruction;
branch prediction circuitry to predict outcomes of branch instructions to be processed by the processing circuitry; and
branch prediction disabling circuitry to:
  detect whether the processing circuitry is executing the program loop body of the zero-overhead loop associated with the zero-overhead loop control instruction; and
  dependent on detecting that the processing circuitry is executing the program loop body of the zero-overhead loop, disable the branch prediction circuitry; in which:
the branch prediction disabling circuitry is configured to detect, based on a zero-overhead loop active indication, whether the processing circuitry is executing the program loop body of the zero-overhead loop associated with the zero-overhead loop control instruction;
and
at least one of:
  in response to the processing circuitry executing the zero-overhead loop control instruction of the instruction set architecture, when at least one more iteration of the program loop body is required after execution of the zero-overhead loop control instruction, the branch prediction disabling circuitry is configured to set the zero-overhead loop active indication to indicate that the processing circuitry is executing the program loop body of the zero-overhead loop;
  in response to a zero-overhead loop end branch operation being performed following a given iteration of the program loop body of the zero-overhead loop to branch to a start of the program loop body of the zero-overhead loop for a subsequent iteration, the branch prediction disabling circuitry is configured to set the zero-overhead loop active indication to indicate that the processing circuitry is executing the program loop body of the zero-overhead loop; and
  the branch prediction disabling circuitry is configured to clear the zero-overhead loop active indication in response to detecting that no further iterations of the program loop body of the zero-overhead loop are required.

* * * * *